(12) United States Patent
Kamdar et al.

(10) Patent No.: US 10,140,644 B1
(45) Date of Patent: *Nov. 27, 2018

(54) SYSTEM AND METHOD FOR GROUPING CANDIDATE DOMAIN NAMES FOR DISPLAY

(71) Applicant: Go Daddy Operating Company, LLC, Scottsdale, AZ (US)

(72) Inventors: Tapan Kamdar, San Jose, CA (US); Garrett Matsudaira, Bellevue, WA (US); Stacy Steinkuller, Phoenix, AZ (US); Nitin Gupta, Mountain View, CA (US); Michael McLaughlin, Menlo Park, CA (US); Edward J. Karcher, III, Chandler, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 1090 days.

This patent is subject to a terminal disclaimer.

(21) Appl. No.: 14/504,183

(22) Filed: Oct. 1, 2014

Related U.S. Application Data

(63) Continuation-in-part of application No. 14/051,358, filed on Oct. 10, 2013, now Pat. No. 9,684,918.

(51) Int. Cl.
    *G06Q 30/00* (2012.01)
    *G06Q 30/06* (2012.01)

(52) U.S. Cl.
    CPC ..... *G06Q 30/0625* (2013.01); *G06Q 30/0623* (2013.01)

(58) Field of Classification Search
    CPC ........... G06Q 30/0623; G06Q 30/0641; G06Q 30/0625

(Continued)

(56) References Cited

U.S. PATENT DOCUMENTS

| | | |
|---|---|---|
| 6,332,158 B1 | 12/2001 | Risley et al. |
| 6,338,082 B1 | 1/2002 | Schneider |

(Continued)

FOREIGN PATENT DOCUMENTS

| | | |
|---|---|---|
| JP | 2002297938 | 10/2002 |
| WO | 9909726 | 2/1999 |

OTHER PUBLICATIONS

Business Wire: "The Net is Not Just Technology-Oriented Anymore; Leisure Words and Phrases Make Up Nearly Half of Domain Names," Oct. 24, 2000; ProQuest Dialog #445853815, 5pgs.*

(Continued)

*Primary Examiner* — Robert M Pond
(74) *Attorney, Agent, or Firm* — Quarles & Brady LLP

(57) ABSTRACT

A system and method for the generation and presentation of candidate domain names are presented. The method includes receiving, by at least one server communicatively coupled to a network, a request to access or purchase access to a software application, the request being received from a user. Keywords associated with at least one of the user, a website of the user, and a business of the user are generated and a candidate domain name relevant to the keywords is generated. A user interface is displayed including the candidate domain name. The user interface enables the user to register the candidate domain name. A plurality of candidate domain names may be generated and organized into carousels or stacks according to a common theme. The candidate domain names may be displayed on a user interface and arranged thereon according to a relevance score of the domain name bundles.

16 Claims, 26 Drawing Sheets

(58) Field of Classification Search
USPC .................................................. 705/26, 27
See application file for complete search history.

(56) References Cited

U.S. PATENT DOCUMENTS

| | | | |
|---|---|---|---|
| 6,560,634 | B1 | 5/2003 | Broadhurst |
| 6,745,248 | B1 | 6/2004 | Gardos et al. |
| 6,760,746 | B1 | 7/2004 | Schneider |
| 6,895,430 | B1 | 5/2005 | Schneider |
| 6,901,436 | B1 | 5/2005 | Schneider |
| 6,973,505 | B1 | 12/2005 | Schneider |
| 6,980,990 | B2 | 12/2005 | Fellman |
| 7,000,028 | B1 | 2/2006 | Broadhurst et al. |
| 7,039,697 | B2 | 5/2006 | Bayles |
| 7,143,048 | B1 | 11/2006 | Ruben et al. |
| 7,188,138 | B1 | 3/2007 | Schneider |
| 7,194,552 | B1 | 3/2007 | Schneider |
| 7,299,299 | B2 | 11/2007 | Hollenbeck et al. |
| 7,305,394 | B2 | 12/2007 | Fellman |
| 7,418,471 | B2 | 8/2008 | King et al. |
| 7,606,858 | B2 | 10/2009 | King et al. |
| 7,627,628 | B2 | 12/2009 | King et al. |
| 7,664,831 | B2 | 2/2010 | Cartmell et al. |
| 7,702,902 | B2 | 4/2010 | Thayer et al. |
| 7,890,602 | B1 | 2/2011 | Parsons et al. |
| 8,037,168 | B2 | 10/2011 | Schneider |
| 8,065,300 | B2 | 11/2011 | Gupta et al. |
| 8,276,057 | B2 | 9/2012 | Rowe et al. |
| 8,301,743 | B2 | 10/2012 | Curran et al. |
| 8,489,746 | B2 | 7/2013 | Nicks et al. |
| 8,706,728 | B2 | 4/2014 | Nicks et al. |
| 9,065,794 | B2 * | 6/2015 | Smith .................. G06F 17/2795 |
| 9,483,789 | B1 | 11/2016 | Hanlon et al. |
| 2002/0065903 | A1 | 5/2002 | Fellman |
| 2002/0091703 | A1 | 7/2002 | Bayles |
| 2002/0091827 | A1 | 7/2002 | King et al. |
| 2002/0120537 | A1 | 8/2002 | Morea et al. |
| 2002/0194373 | A1 | 12/2002 | Choudhry |
| 2003/0149690 | A1 | 8/2003 | Kudlacik et al. |
| 2004/0162895 | A1 | 8/2004 | Mok et al. |
| 2004/0162916 | A1 | 8/2004 | Ryan |
| 2004/0167982 | A1 | 8/2004 | Cohen et al. |
| 2004/0199493 | A1 | 8/2004 | Ruiz et al. |
| 2004/0172463 | A1 | 9/2004 | King et al. |
| 2004/0199520 | A1 | 10/2004 | Ruiz et al. |
| 2004/0199608 | A1 | 10/2004 | Rechterman |
| 2005/0114484 | A1 | 5/2005 | Wilson et al. |
| 2005/0125451 | A1 | 6/2005 | Mooney |
| 2005/0203891 | A1 | 9/2005 | Broadhurst et al. |
| 2005/0216288 | A1 | 9/2005 | Parsons et al. |
| 2005/0216290 | A1 * | 9/2005 | Sachs ................. G06Q 10/0637 705/310 |
| 2005/0234921 | A1 | 10/2005 | King et al. |
| 2005/0256853 | A1 | 11/2005 | Fellman |
| 2006/0004784 | A1 | 1/2006 | Ableman |
| 2006/0161682 | A1 | 7/2006 | King et al. |
| 2006/0168020 | A1 | 7/2006 | Brennan, III |
| 2006/0218303 | A1 | 9/2006 | Adelman et al. |
| 2006/0230380 | A1 | 10/2006 | Holmes et al. |
| 2006/0271668 | A1 | 11/2006 | Parsons et al. |
| 2007/0112950 | A1 | 5/2007 | Parsons et al. |
| 2007/0180056 | A1 | 8/2007 | Assad |
| 2007/0198495 | A1 | 8/2007 | Buron et al. |
| 2007/0208869 | A1 | 9/2007 | Adelman et al. |
| 2007/0271393 | A1 | 11/2007 | Wong |
| 2008/0005127 | A1 | 1/2008 | Schneider |
| 2008/0010365 | A1 | 1/2008 | Schneider |
| 2008/0016142 | A1 | 1/2008 | Schneider |
| 2008/0071909 | A1 | 3/2008 | Young et al. |
| 2008/0133580 | A1 | 6/2008 | Wanless et al. |
| 2008/0222125 | A1 | 9/2008 | Chowdhury |
| 2008/0270418 | A1 | 10/2008 | Chen et al. |
| 2008/0270486 | A1 | 10/2008 | Hind et al. |
| 2009/0006351 | A1 | 1/2009 | Stephenson et al. |
| 2009/0094137 | A1 | 4/2009 | Toppenberg et al. |
| 2009/0144259 | A1 * | 6/2009 | Sundaresan ....... G06F 17/30648 |
| 2009/0241066 | A1 | 9/2009 | Costello |
| 2009/0248735 | A1 * | 10/2009 | Adelman .......... G06F 17/30705 |
| 2010/0070448 | A1 | 3/2010 | Omoigui |
| 2010/0114991 | A1 | 5/2010 | Chaudhary et al. |
| 2010/0146001 | A1 * | 6/2010 | Lee .................... G06F 17/3089 707/792 |
| 2010/0250353 | A1 | 9/2010 | Zimmerman et al. |
| 2011/0016022 | A1 | 1/2011 | Essawi et al. |
| 2011/0055248 | A1 | 3/2011 | Consuegra et al. |
| 2011/0125830 | A1 | 5/2011 | Adelman |
| 2011/0125831 | A1 | 5/2011 | Adelman |
| 2011/0208513 | A1 | 8/2011 | Nicks et al. |
| 2011/0208723 | A1 | 8/2011 | Nicks et al. |
| 2012/0072407 | A1 | 3/2012 | Shyamsunder et al. |
| 2013/0173497 | A1 | 7/2013 | Gould et al. |
| 2014/0032589 | A1 | 1/2014 | Styler et al. |

OTHER PUBLICATIONS

GHG Internet Services, "Domain Name Registration Information", pp. 1 and 2, Jan. 2002.
DomainNICnames home page, Jul. 23, 2002.
The Domain Name Exchange, http://www.web.archive.org/web/20001019034237/http://afternic.com, Oct. 19, 2000.
The Domain Name Exchange, http://www.web.archive.org/web/19991127181836/http://afternic.com, Nov. 27, 1999.
Google SafeSearch Filtering (http://web.archive.org/web/20030702191745/http://www.google.com/intl/en/help/customize.html), Jul. 2003, WaybackMachine.
Matt Mazur, CNET!—Let's see what happens (Domain Pigeon), Apr. 9, 2009.
GoDaddy.com screen shot, http://web.archive.org/web/20030401091726/www.godaddy.com/gdshop/default.asp? e=com, Apr. 1, 2003.
www.GoDaddy.com screen shot, Dec. 6, 2002.
Internet Practice Solutions—Domain Registration Services [Online], Apr. 4, 2001.
Lowensohn, Domain Pigeon now finds open Twitter Names, Apr. 9, 2009.
EstiBot.com User's Guide, Feb. 4, 2010, pp. 1-22.
Nameboy Ultimate Domain Name Generator, search, creation, domain name lookup and domain registration, Oct. 22, 2008 pp. 1-2.
Ohman, Watch Me Hand Register Keyword .com Domains Worth More than $100, Feb. 21,2009, pp. 1-5.
Information retrieval—Wikipedia, the free encyclopedia, Nov. 10, 2009, pp. 1-8.
Laidlaw, What's Your Web Site Worth, May 7, 2008, pp. 1-22.
InterNIC, "InterNIC FAQs on the Domain Names, Registrars, and Registration." Sep. 25, 2003. http://www.internic.netlindex.html.
"Domain Name Search." Jan. 31,2001. www.domainsearch.com.
A Major Domain to be Sold at Auction on Oct. 30th—WebChat.com—Offers Premium Web Presence and Growth Opportunity in the Booming Online and Mobile Communications Industry. Anonymous. Oct. 10, 2008.
Staking a claim in cyberspace: [ONT Edition], Rider, David. Toronto Star [Toronto, Ont] Aug. 18, 2007: L 12. Downloaded from ProQuestDirect on the Internet on Mar. 11, 2013, 2 pages.
GoDaddy.com(R) Scores Stunning Super Bowl XL(R) Victory. PR Newswire [New York] Feb. 7, 2006: Downloaded from ProQuestDirect on the Internet on Mar. 11, 2013, 2 pages.
Sedo to host "Around the world in seven days" online Auction, PR Newswire, Europe Including UK, Feb. 11, 2008, downloaded from ProQuestDirect on the Internet on Mar. 11, 2013, 2 pages.
MapQuest Online Mapping Software as seen on Apr. 16, 2009.
Margaret Rouse (Crawler, TechTarget: SearchSOA, Apr. 5, 2005). http://searchsoa.techtarget.com/definition/crawler.

* cited by examiner

```
┌─────────────────────────────────────────────┐  ← 700
│ FILMISNOTDEAD.COM           │ SEARCH DOMAIN │
│ GOOD NEWS, THIS DOMAIN IS AVAILABLE         │
│ ┌─────────────────────────────────────────┐ │
│ │          FILMISNOTDEAD.COM              │ │
│ │              $8.29*                     │ │
│ │              [ADD]                      │ │
│ └─────────────────────────────────────────┘ │
│ ┌─────────────────────────────────────────┐ │
│ │ ⓘ EXPAND YOUR ONLINE FOOTPRINT WITH A BUNDLE │
│ │   VALUE BUNDLE                          │ │
│ │ < FILMISNOTDEAD.NET    $12.99* [ADD] >  │ │
│ │   FILMISNOTDEAD.CO                      │ │
│ │   FILMISNOTDEAD.INFO                    │ │
│ └─────────────────────────────────────────┘ │
│      <FILTERS      93 RESULTS SHOW ALL      │
│ ┌──────────────┬──────────────┬───────────┐ │
│ │PRICE       > │FILMISNOTDEAD │FILMISNOTDEAD│
│ │CHAR. LENGTH >│   .WEBCAM    │  .CAMERA   │
│ │CATEGORY    > │   $19.99     │   $23.99   │
│ │EXTENSIONS  > │   [ADD]      │   [ADD]    │
│ │LOCATION    > │FILMISNOTDEAD │FILMISNOTDEAD│
│ │AVAILABILITY> │   .CLUB      │   .TIPE    │
│ │              │   $9.99      │   $15.99   │
│ │              │   [ADD]      │   [ADD]    │
│ └──────────────┴──────────────┴───────────┘ │
│            SHOW  MORE ⊕                     │
│         COMMON VARIATIONS                   │
│    DOMAINS SIMILAR TO WHAT YOU REQUESTED    │
│ FILMISNOW.NET │FILMISNOTDEADME│FILMISNOTDEADNOW
│   $12.99      │    .COM       │   .COM     │
│   [ADD]       │   $8.29*      │   $8.29*   │
│               │   [ADD]       │   [ADD]    │
│ FILMISNOTDEADINC│FILMISNOTDEADSEA│FILMISNOTDEADSHOP
│   .COM        │   .COM        │   .COM     │
│   $8.29*      │   $8.29*      │   $8.29*   │
│   [ADD]       │   [ADD]       │   [ADD]    │
│            SHOW  MORE ⊕                     │
└─────────────────────────────────────────────┘
```

719 points to the filter list (PRICE, CHARACTER LENGTH, CATEGORY, EXTENSIONS, LOCATION, AVAILABILITY).

702 brackets the COMMON VARIATIONS section.

FIG. 16C

SYSTEM AND METHOD FOR GROUPING CANDIDATE DOMAIN NAMES FOR DISPLAY

CROSS-REFERENCE TO RELATED APPLICATIONS

This application is a continuation-in-part and claims the benefit of U.S. patent application Ser. No. 14/051,358, filed Oct. 10, 2013, and entitled "CANDIDATE DOMAIN NAME GENERATION," and this application is related to U.S. patent application Ser. No. 14/504,188 entitled "System and Method for Dynamic Grouping and Display of Candidate Domain Name Bundles," Ser. No. 14/504,192 entitled "System and Method for Presentation of Candidate Domain Name Bundles in User Interface," and Ser. No. 14/504,200 entitled "System and Method for Presentation of Candidate Domain Name Stacks in User Interface," each filed Oct. 1, 2014, all of which applications are incorporated herein by reference.

FIELD OF THE INVENTION

The present invention relates generally to the display of candidate domain names to a user for purchase and, more particularly, to systems and methods for grouping a plurality of candidate domain names together and presenting them to the user in viewable carousels and viewable stacks.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as web pages. Websites comprise a collection of connected, or otherwise related, web pages. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related web pages. Websites, unless extremely large and complex or exposed to unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, the browser requests and receives information from the webpage, typically in the form of an HTML document, and then displays the webpage content for the user. The user then may view other web pages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

For many users that wish to have an Internet presence, the selection of a particular domain name may be secondary consideration. Some users, for example, may desire to construct a website and may even have a vague understanding of the concept of a domain name, but may not understand that a domain name must be registered before the website can be hosted there. Other users may have already registered a domain name, but may not understand that a domain name must, in many cases, be selected in order optimize the search engine performance of the domain name and associated website. For example, a customer may wish to purchase advertising services for a website at a particular domain name, but may not understand that the domain name is a poor match for the desired advertising. In such a case, the user may observe better performance for the advertising if the user were to register a new, better suited, domain name and host the website on that domain name.

Domain names can have many, potentially thousands, of "connected" domain names that receive intentional or unintentional "traffic" (i.e., volume and frequency of visitors). Example connections include misspellings of the selected domain name, different top-level domains from the selected domain name, domain names having appended local identifiers (e.g. "mywebsitenyc.com" is connected to "mywebsite.com"), and the like. Many users may be unaware that more traffic to the user's primary websites can be generated by registering and managing domain names that are connected in some fashion to the selected domain name. Furthermore, the users may be unaware that other entities could register those connected domain names and direct the traffic thereto away from the users' websites. More sophisticated users may be aware of these traffic issues but may not know how to identify the most valuable, and economically viable, subset of connected domain names to own.

BRIEF DESCRIPTION OF THE DRAWINGS

FIG. 8B is a screenshot showing an example form the requester can complete to provide input data while using a website builder application.

FIG. 8C is a screenshot showing an example checkout page user interface including a candidate domain name.

FIG. 10 is a screenshot showing an example website information page by which the requester can complete a website information form to provide input data while using an advertising software application provided by the registrar.

FIGS. 16A-D are diagrams showing an example user interface for displaying candidate domain names in stacks of themed sets.

DETAILED DESCRIPTION

Figure 1:
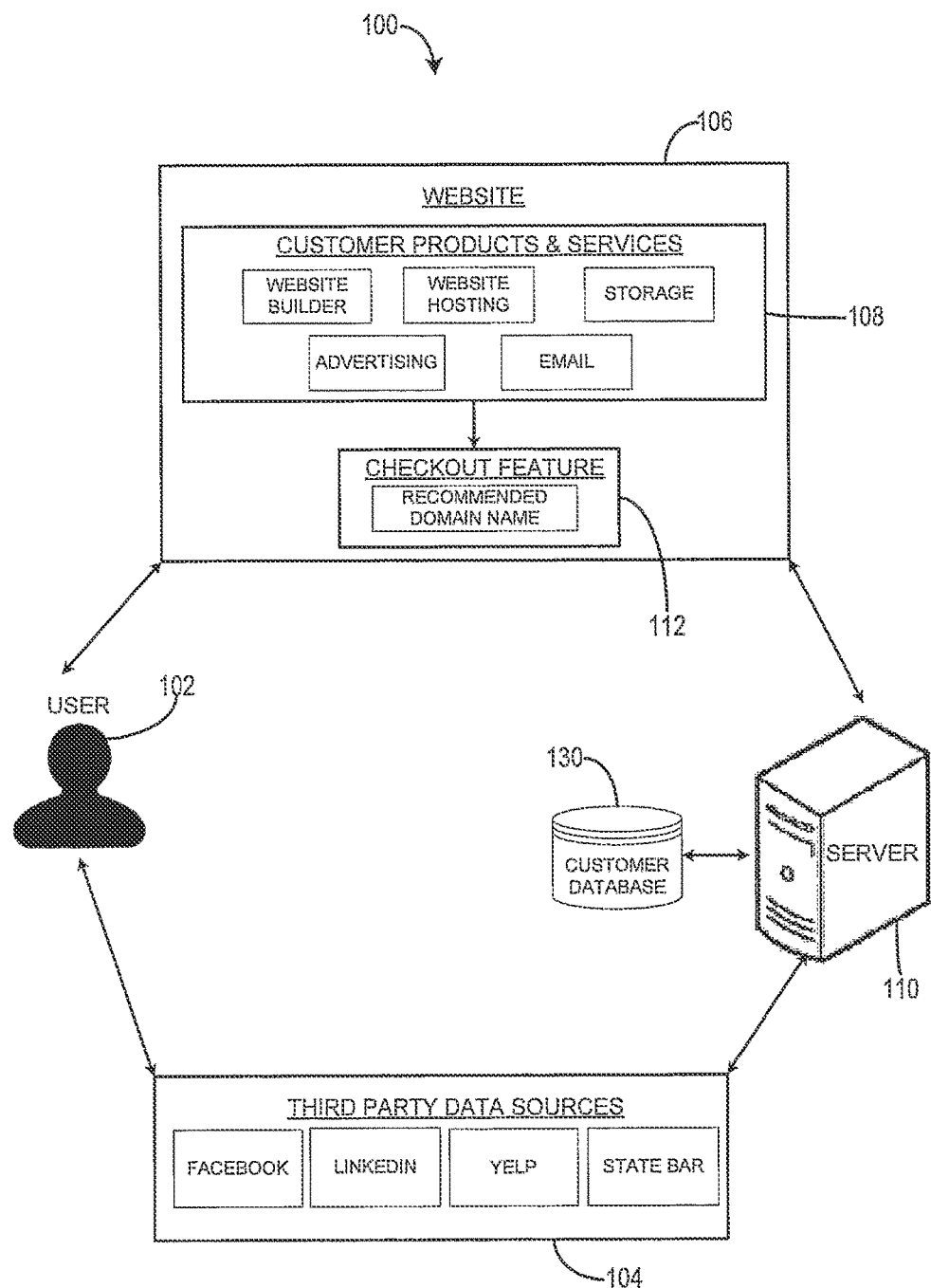
FIG. 1 illustrates a possible embodiment of a system for generating a candidate domain name.

The present invention relates generally to the generation and grouping of candidate domain names and to the adaptable display of groups of candidate domain names to a user.

In one implementation, the present disclosure provides a method performed by at least one server communicatively coupled to a network. The method includes receiving from a user input data including one or more search terms, obtaining a plurality of candidate domain names relevant to the input data, and arranging the plurality of candidate domain names into one or more sets such that each of the sets contains at least one of the candidate domain names. Each of the sets has a relevance score relative to one or both of the search terms and the user. In another implementation, the present disclosure provides a system including at least one server computer in communication with a network and including a processor configured to receive input data from a user, obtain one or more candidate domain names relevant to the input data, and display a user interface including one or more of the sets and enabling the user to register one or more of the candidate domain names. The input data includes one or more search terms. The candidate domain names are arranged into one or more sets. Each set has a relevance score relative to one or both of the search terms and the user.

In another implementation, the present disclosure provides a method performed by at least one server communicatively coupled to a network. The method includes receiving from a user input data that includes one or more search terms, obtaining one or more candidate domain names relevant to the input data and arranged into one or more bundles, and displaying a user interface including one or more of the bundles and enabling the user to select one or more of the bundles, wherein each bundle is displayed according to a relevance score. In another implementation, the present disclosure provides a system including at least one server computer in communication with a network and including a processor configured to receive input data from a user, obtain one or more candidate domain names relevant to the input data, and display a user interface including one or more of the bundles and enabling the user to register one or more of the bundles. The input data includes one or more search terms. The candidate domain names are arranged into one or more bundles. Each bundle is displayed according to a relevance score.

In another implementation, the present disclosure provides a method of displaying candidate domain names for registration by a user, the method being performed by at least one server communicatively coupled to a network. The method includes presenting, to a user via a user device in electronic communication with the computer network, a user interface. The user interface includes a carousel presenting a plurality of bundles, each bundle including a plurality of the candidate domain names, the candidate domain names being related to input data specified by the user, and the carousel enabling the user to paginate through the bundles. The user interface further includes a selection mechanism to permit the selection of at least one relevant bundle from the plurality of bundles, to thereby enable the user to formulate a request to register the candidate domain names in the relevant bundle.

In another implementation, the present disclosure provides a method of displaying candidate domain names for registration by a user, the method being performed by at least one server communicatively coupled to a network. The method includes: obtaining a web page that includes a user interface; receiving, from a user via a user device in electronic communication with the computer network, a user query including input data; and presenting, to the user via the user device, the web page. The user interface includes a carousel presenting a plurality of bundles, each bundle including a plurality of the candidate domain names, the candidate domain names being related to the input data, and the carousel enabling the user to paginate through the bundles. The user interface further includes a selection mechanism to permit the selection of at least one relevant bundle from the plurality of bundles, to thereby enable the user to formulate a request to register the candidate domain names in the relevant bundle.

In another implementation, the present disclosure provides a method of displaying candidate domain names for registration by a user, the method being performed by at least one server communicatively coupled to a network. The method includes presenting, to a user via a user device in electronic communication with the computer network, a user interface. The user interface includes a plurality of sets each including one or more of the candidate domain names, the candidate domain names being related to input data specified by the user, and each set being displayed as one or more domain tiles each associated with one of the candidate domain names of the set. The user interface further includes a selection mechanism to permit the selection of at least one of the candidate domain names from at least one of the plurality of sets, to thereby enable the user to formulate a request to register the selected candidate domain names.

In another implementation, the present disclosure provides a method of displaying candidate domain names for registration by a user, the method being performed by at least one server communicatively coupled to a network. The method includes: obtaining a web page that includes a user interface; receiving, from a user via a user device in electronic communication with the computer network, a user query including input data; and presenting, to the user via the user device, the web page. The user interface includes a plurality of sets each including one or more candidate domain names, the candidate domain names being related to input data specified by the user, and each set being displayed as one or more domain tiles each associated with one of the candidate domain names of the set. The user interface further includes a selection mechanism to permit the selection of at least one of the candidate domain names from at least one of the sets, to thereby enable the user to formulate a request to register the selected candidate domain names.

A user operating hosted software applications (e.g., website builders, email, website hosting, storage, auctions, advertising, etc.) or browsing for and purchasing the same often provides a large amount of information, either personal or business related, to the host of those applications, such as a registrar. Many users, however, may not understand or want to take the steps necessary to search for and register a domain name while utilizing the client software applications or browsing for and purchasing the same. Therefore, the present system can monitor the user's activities and provide the user with a listing of relevant candidate domain names and sets of domain names, as an automated process, based on the information provided by the user during interaction with the client software applications. If the user, upon reviewing one or more of the provided candidate domain names or sets of domain names, wishes to register one or more of the candidate domain names, the user can select the desired domain name or set of domain names and undertake a registration procedure.

FIG. 1 is a system 100 for generating one or more candidate domain names for a user 102 accessing a website 106. The website 106 may, for example, include a website or web service hosted by a registrar or other entity. The website 106 may provide one or more software applications 108 (e.g., website builders, email, website hosting, storage, auctions, advertising, etc.) for purchase or with which the user 102 can interact. As the user 102 interacts with the plurality of client software applications 108, the user 102 provides input data (e.g., personal information or business information) that can be stored in a customer database 130 hosted on a server 110 hosting the website 106. The server 110 hosting the website 106 can process the input data provided by the user 102 and analyze that input data to generate candidate domain names for purchase using a checkout feature 112. The website 106 can then provide those relevant candidate domain names to the user 102, for example, while the user 102 is purchasing or otherwise operating one of the plurality of client software applications 108 or is otherwise interacting with one or more software applications 108 hosted by server 110. Optionally, the server 110 may gather and process additional data and information about the user 102 from third party data sources 104 (e.g., FACEBOOK, LINKEDIN, YELP, TWITTER, State Bar, etc.) based on the input data provided by the user 102 in order to provide a more relevant candidate domain name to the user or the user's business.

In general, the present system allows for the monitoring of the actions of a user while that user interacts with a website. The interactions may involve the user shopping for (e.g., searching for information describing) and purchasing goods or services or utilizing one or more hosted software application provided by the website. As the user interacts with the website, the user is providing information to the website, either explicitly or implicitly. For example, the user may explicitly provide information during a user account creation process or product research and product purchase and checkout process. Similarly, the user may input information into one or more software application, such as a website builder or advertising service. Alternatively, the user may implicitly provide information, such as the user's location, products that were searched for and reviewed by the user, but not purchased, and the like. As described below, this information can be collected and analyzed to generate a set of candidate domain names that may be displayed to the user for purchase, where the candidate domain names are relevant to the user, or, for example, the user's business.

Figure 2:
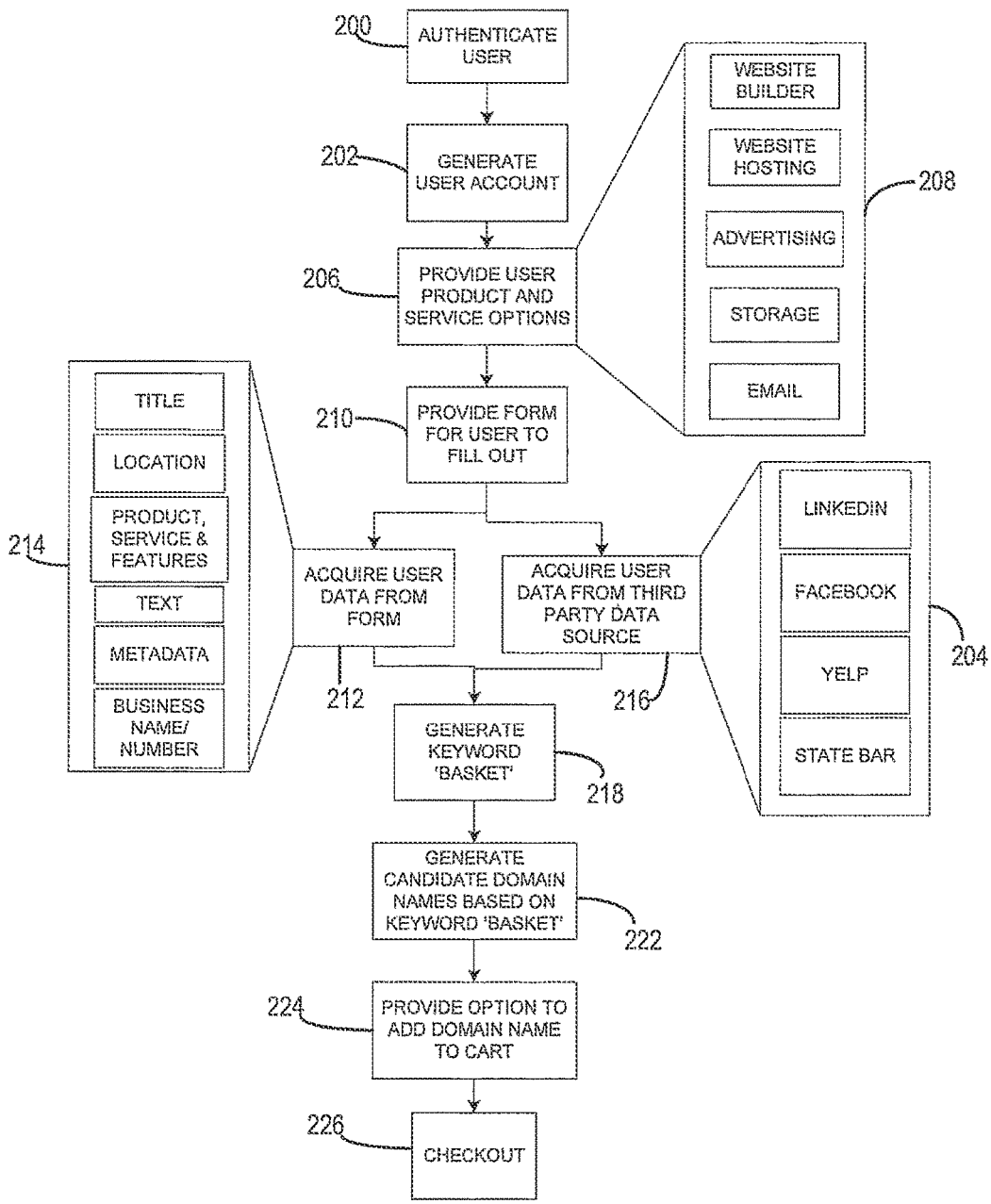
FIG. 2 is a flowchart illustrating a method for generating candidate domain names based on data received during purchase or use of a software application or service.

FIG. 2 is a flowchart illustrating a method by which candidate domain names can be generated for the user 102 based on data received from the user 102 during an acquisition of a software application or service. The method may be useful, for example, to assist users to select and register an appropriate domain name when they are shopping for and purchasing Internet services that typically require the user to also have a domain name. A user, for example, may be shopping for hosting services, but not realize that the hosted content would typically be accessed through a domain name. In that case, the method illustrated in FIG. 2 may be utilized to provide the user with a listing of candidate domain names of which they may wish to purchase one in combination with their hosting services. In other cases, users may be browsing available services and not even realize that they would like to register a domain name. In that case, while the user browses the available services, they can also be provided with a listing of domain names that are relevant to them for selection and registration.

The user 102 begins by accessing the website 106. The user 102 may be any Internet user, for example, who may wish to establish an online presence and may subsequently access the website 106, such as GODADDY.COM's website, to purchase one or more online services. In step 200, the user 102 is authenticated as either an existing user or a new user. If the user 102 is an existing user, the website 106 provides the user 102 with product and service options for purchase at step 206 once the user 102 has logged in with their credentials (i.e., username and password). If the user 102 is a new user, a new user account may be generated at step 202. Once the user account is generated, the website 106 provides the user 102 with a listing of the plurality of client software applications or services 208 for purchase at step 206. In other implementations, the process may be reversed with the user first browsing available product and service options and, after selecting one or more for purchase, authenticating to the website 106 or creating a new user account. The plurality of client software applications and services 208, as a non-limiting example, may include a website builder, website hosting services, search engine visibility (i.e., advertising) services, online storage and/or email applications.

At step 210, once the user has selected one of the software applications or services 208 for purchase, one or more order forms, as will be discussed in further detail below, may be displayed to the user 102 on a user interface. The form may vary depending on which of the plurality of client software applications 208 the user 102 has requested. Generally, the form prompts the user 102 to provide any additional information, if necessary, for the requested services to be provided to the user 102. For example, the form may be a user information form, a business information form, a user contact information form, a website information form or order form requesting specific user 102 information and providing blanks for the user 102 to enter personal and/or business related data through the user interface. As the user 102 completes the form, the information provided by the user 102 is captured. For example, the form may request that the user 102 provide input data 214 that includes, but is not limited to, a title (e.g., a business name), a location (e.g., home and/or business address, city, state, zip code, etc.), a phone number, features relevant to the user's 102 products and services that may be offered by the user's business, email address, text, and metadata such as images provided by the user 102 to the website 106 at step 212. In some implementations, some or all of the data requested by the order form may be populated with information retrieved from the user's account information. In that case, a fillable order form may not be displayed for the user. Instead, the form may be automatically created and the user may simply be provided with a user interface allowing the user to confirm that they wish to purchase the selected software application.

As the user 102 is providing the input data 214, the system 100 may be configured to acquire additional data about the user 102 from third party data sources 204 at step 216. For example, if the user 102 provides their first and last name on the form (or that information can be retrieved from the user's account), the system 100 may run a search on the third party data sources 204 using the user's 102 first and last name to gather additional information about the user 102. The third party data sources 204 may include, but are not limited to, LINKEDIN, FACEBOOK, YELP, TWITTER, and a State Bar directory.

As a non-limiting example, the system 100 may run a search on Facebook.com using the first and last name provided by the user 102. The system 100 may gather information from Facebook.com, such as where the user 102 is from (i.e., city and state), where they are employed, what college they attended, etc.

In step 218, the system 100 combines the data collected about the user in steps 212 and 216 into a collection of keywords, referred to herein as a keyword collection. These keywords (in combination with any other data collected about the user 102) will be used to generate one or more candidate domain names for the user 102, as will be discussed in further detail below. In some implementations, additional sources of information may be used to collect information about the user 102 that may be utilized to make candidate domain name recommendations. Example additional sources include those that include the product search history of the user, the user's purchase history, a listing of other products or services that have already been purchased by the user, the user's customer information, and the like.

After the collection of keywords has been generated, the system 100 can use that collection of keywords to generate one or more candidate domain names for the user 102 that the user 102 may wish to purchase. In some cases, this will involve analyzing, in addition to the collection of keywords, websites of third parties that are relevant to the user or the user's business. In that case, the content of those third party websites can be analyzed to potentially generate additional keywords from which the candidate domain names can be generated or to determine the quality of one or more of the candidate domain names. In some implementations, the system 100 will also determine whether the generated candidate domain names are actually available to be registered. If, for example, a particular candidate domain name has already been registered, that candidate domain name will not be displayed to the user for purchase.

For example, if the user 102 provided input data 214 at step 212 that included words such as "menu" or "food", the system 100 may include these words in the keyword collection at step 218. The words "menu" and "food" from the keyword collection can then be compared to other related websites, such as other restaurant websites, in order to generate one or more candidate domain names relevant to the user's 102 input data 214 at step 222. The candidate domain names provided at step 222 are, therefore, domain names that are relevant to the user 102 and are provided to the user 102 who may not have otherwise been searching for a domain name. Alternatively, if the user 102 was searching for a domain name on the domain name registration website 106, the system 100 may provide the user 102 a link (not shown) to buy more or similar domain names based on the input data 214 and additional data acquired from the third party data sources 204.

In some implementations, the system 100 checks to see if the user already has a registered domain name. If so, the identification of such other domain names can be used to prevent the system 100 from suggesting candidate domain names that are too similar to domain names already registered by the user 102.

In one embodiment of the present invention, the system 100 may be configured to only provide the candidate domain name or alternative domain name at step 222 if a minimum data requirement is met. For example, a new user may utilize one of the client software applications 208 provided by the website 106 and only provide input data 214 that includes their name and email address, for example, at step 212. The minimum data requirement provided by the system 100 may require a minimum of three pieces of information relevant to the user 102. As a non-limiting example, the minimum data requirements may be a name, email address and a location provided by the user 102, either implicitly or explicitly, in order for the system 100 to suggest the candidate or alternate domain name at step 222. Therefore, if the user 102 only provides two pieces of information at step 212, the system may not generate a candidate or alternate domain name at step 222. This minimum data requirement provided by the system 100 may ensure that the candidate and alternate domain names generated at step 222 are in fact relevant to the user 102 based on the keyword collection generated at step 218. Alternatively, a relevance score may be internally generated by the system 100 for the candidate or alternate domain name at step 222 based on the keyword collection currently available. If the relevance score is greater than a predefined threshold, for example, the candidate or alternate domain name would be displayed to the user 102.

Once a candidate domain name or an alternate domain name is generated based on the keyword collection at step 222, the system 100 may provide the user 102 an option to add the domain name to their shopping cart at step 224 for purchase. Step 224 may occur, for example, as the user is going through a checkout process 112 for purchase of the client software application 208. At step 226, the user 102 may checkout and purchase the client software application 208 and, optionally, the domain name generated at step 222.

To illustrate, FIG. 8C is a screenshot showing an example checkout page user interface including a candidate domain name. As shown in FIG. 8C, candidate domain name 834 may be displayed to the user 102 on the website 106. For example, the candidate domain name 834 may be 'mikesrestaurant.com' based on the keywords generated at step 218 of the method of FIG. 2. The candidate domain name 834 may be displayed while the user 102 is going through a checkout process 112 for a website builder application 808, for example. Alternatively, the candidate domain name 834 may be displayed while the user 102 is going through a checkout process 112 for an alternative product or service, such as those provided at step 206 of FIG. 2. The user 102 may choose to add the candidate domain name 834 to their shopping cart by selecting an 'Add' button 836. The user 102 may select a 'checkout' button 838 to complete their purchase of the website builder application 808 and, optionally, the domain name 834 generated at step 222.

Figure 3:
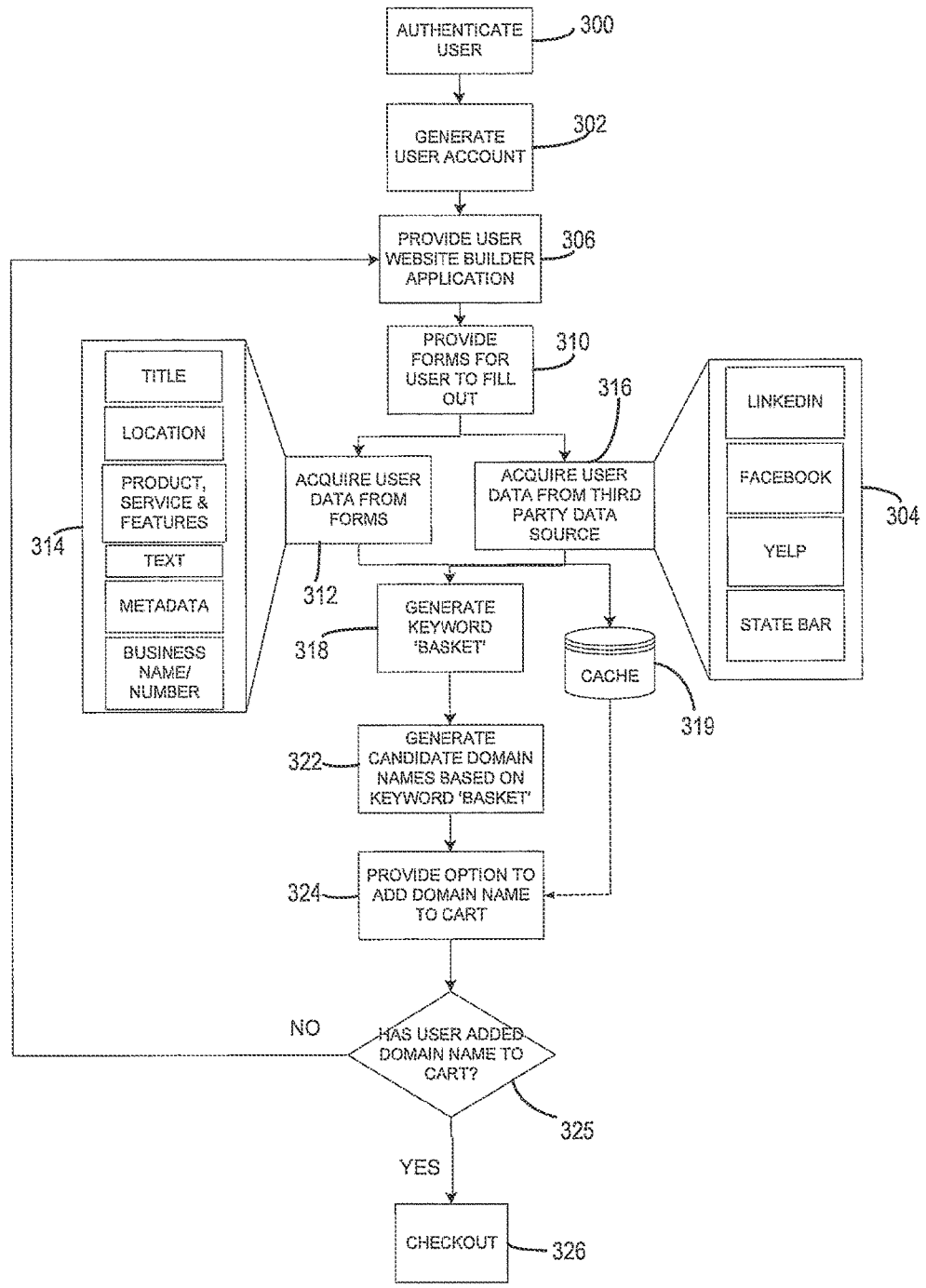
FIG. 3 is a flowchart illustrating a method for generating candidate domain names based on data related to a website builder application.
Figure 8A:
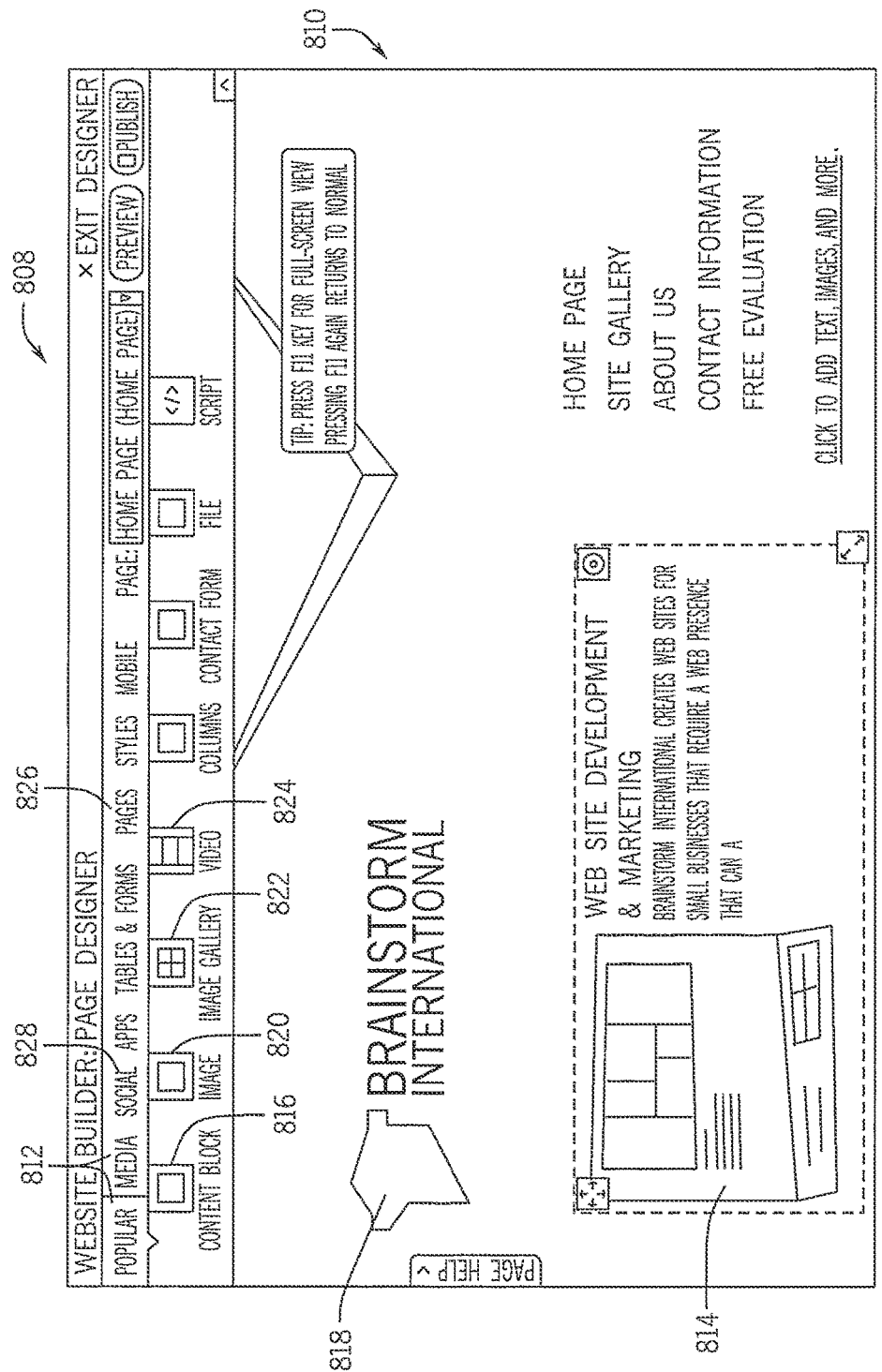
FIG. 8A is a screenshot showing an example user interface by which the requester can build a website using a website builder application.
Figure 8B:
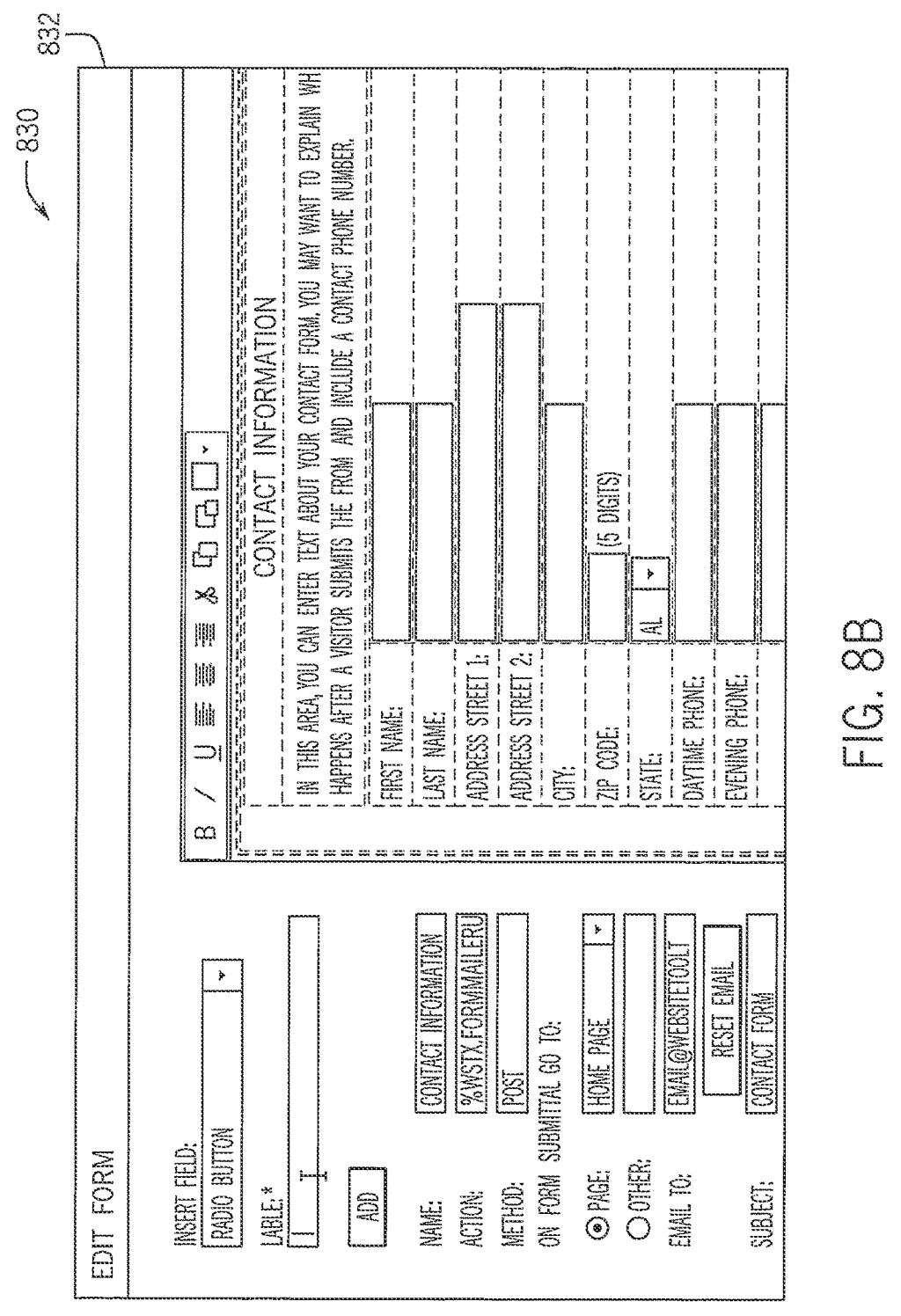
Figure 8C:
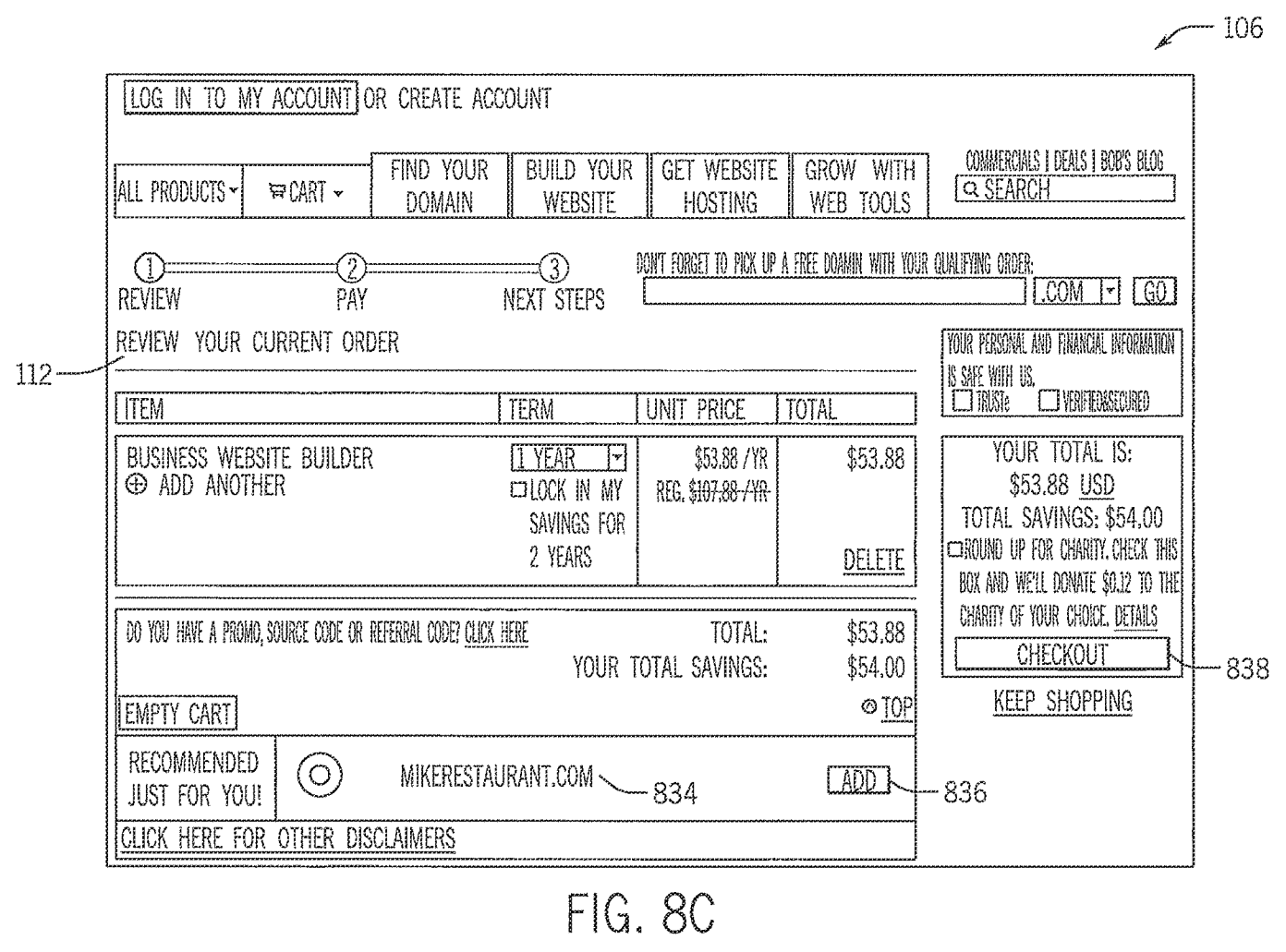

Turning now to FIG. 3, a flowchart illustrating a method by which candidate domain names can be generated for the user 102 based on data received by the user 102 while utilizing a software application or service, such as a website builder 808, shown in FIG. 8A, is shown. Although the present flowchart and method is described in terms of a user utilizing a specific type of software application (i.e., a website builder), the methods illustrated in FIG. 3 and described herein may be utilized in conjunction with a user utilizing any software application that involves the user supplying information, either explicitly or implicitly, to a software application. For example, the method may be utilized to provide a user with a listing of candidate domain names for purchase while the user is interacting with email software, web hosting management software, accounting software, and the like.

Similarly to the flowchart illustrated in FIG. 2, the user 102 begins by accessing the website 106. In step 300, the user 102 is authenticated as either an existing user or a new user. If the user 102 is an existing user, the website 106 provides the user 102 access to the website builder application 808 at step 306 once the user 102 has logged in with their credentials (i.e., username and password). If the user 102 is a new user, a new user account may be generated at step 302. Once the user account is generated, the website 106 provides the user 102 the website builder application 808 at step 306.

As a new user, the website builder application 808 will provide the user 102 a plurality of website templates (not shown) to begin building their website. The website templates are pre-designed and may be related to categories such as business and services, music, entertainment, online shop, restaurant and hospitality, photography, design, retail and fashion, personal, etc. Once a template is selected, the user 102 can begin building a website using the website builder application 808. As such, the user 102 is provided with a user interface 810, such as that shown in FIG. 8A. Within the interface, menu options 812 may be provided on the user interface 810 to assist the user 102 in building their website. Beginning with a home page, as shown in FIG. 8A, the user 102 may add a content block 814 to the website, for example, that gives a brief description of the website being built. The user 102 simply drags a content block icon 816 to the desired location on the user interface 810 and the user 102 can type directly into the content block 814.

Additionally, the user 102 may add an image 818 (e.g., a company logo) to the home page of the website by simply dragging the image icon 820 to the desired location on the user interface 810. The image 818 may be provided by the user 102 or may be a stock image provided by the website builder application 808. Similarly, the user has the option to add image galleries or video, for example, to their website by simply dragging an image gallery icon 822 or a video icon 824 to the desired location on the user interface 810. The user 102 further has the option to add additional pages to their website by selecting the pages 826 menu option. Other pages 826, may include, but are not limited to, a site gallery page, an about us page, a contact information page, an online store page, a site map, a forum page, etc. The user 102 also has the option to provide a link to their social web pages (e.g., LINKEDIN, TWITTER, FACEBOOK, etc.) by selecting a social menu option 828, as will be discussed in further detail below.

Returning to the flowchart illustrated in FIG. 3, the user 102 may navigate, edit, and update their website using the website builder application 808 as described above and provided at step 306. At step 310, while the user 102 edits their website using the website builder application 808, various forms, such as user information forms, business information forms, user contact forms, website information forms, etc., may be provided to the user 102 for the user 102 to complete. For example, when the user 102 adds a content block 814 to the website, adds images 818, image galleries, videos or updates a contact information page 830, as shown in FIG. 8B, each action may involve the user completing forms other otherwise providing information to the website builder application 808. The forms may vary depending on which menu option 814 the user 102 is utilizing. In some cases, the forms include explicit user input devices (e.g., textboxes, check boxes, radio buttons, and the like) into which the user provides input. Alternatively, the forms may be incorporated into other user interfaces allowing the user to added content to or revise content within the user's website. For example, the interface through which the user adds images to their website is considered a form, as is the mechanism by which the user adds video. Regardless of the menu options 812 being used, the server 110 shown in FIG. 1 acquires data from the user 102 as the user manipulates their website using the website builder application 808.

For example, the user 102 may fill out a user contact information form 832 while creating or editing the contact information page 830 of their website, as shown in FIG. 8B. The user contact information form 832 may enable the user 102 to provide input data 314 such as a first name, last name, address, city, state, zip code, phone number, etc. Returning to FIG. 2, after capturing the input data 314, the system 100 may be configured to acquire additional data about the user 102 or the user's business from third party data sources 304 at step 316. For example, if the user 102 provides their first and last name on the user contact information form 832, the system 100 may run a search on the third party data sources 304 using the user's 102 first and last name to gather additional information about the user 102. The third party data sources 304 may include, but are not limited to, LINKEDIN, FACEBOOK, YELP, TWITTER and a State Bar directory. As a non-limiting example, the system 100 may run a search on Facebook.com using the first and last name provided by the user 102. The system 100 may gather information from Facebook.com, such as where the user 102 is from (i.e., city and state), where they are employed, what college they attended, etc.

The system 100 provides an integration module (not shown) to generate a keyword collection at step 318 by running a content analysis (e.g., crawl) on the website being built by the user 102 that identifies keywords throughout the pages of the website. The keyword collection may contain, for example, keywords related to the user 102 acquired at steps 312 and 316, keywords selected from title text on the user's website, and information collected from third party sources about the user or the user's business. A cache storage database 319 may be provided by the system 100 to store the input data 314 provided by the user 102 at step 312 and to store data related to the user 102 acquired from the third party data sources 304 at step 316. The keywords generated at step 318 will be used to generate a candidate domain name for the user 102, as will be discussed in further detail below.

After the collection of keywords has been generated, the system 100 can use that collection of keywords to generate one or more candidate domain names for the user 102 that the user 102 may wish to purchase. In some cases, this will involve analyzing, in addition to the collection of keywords, websites of third parties that are relevant to the user or the user's business. In that case, the content of those third party website's can be analyzed to potentially generate additional keywords from which the candidate domain names can be generated.

In some implementations, the system 100 checks to see if the user already has a registered domain name. If so, the identification of these other domain names can be used to prevent the system 100 from suggesting candidate domain names that are too close to domain names already registered by the user 102.

Figure 8D:
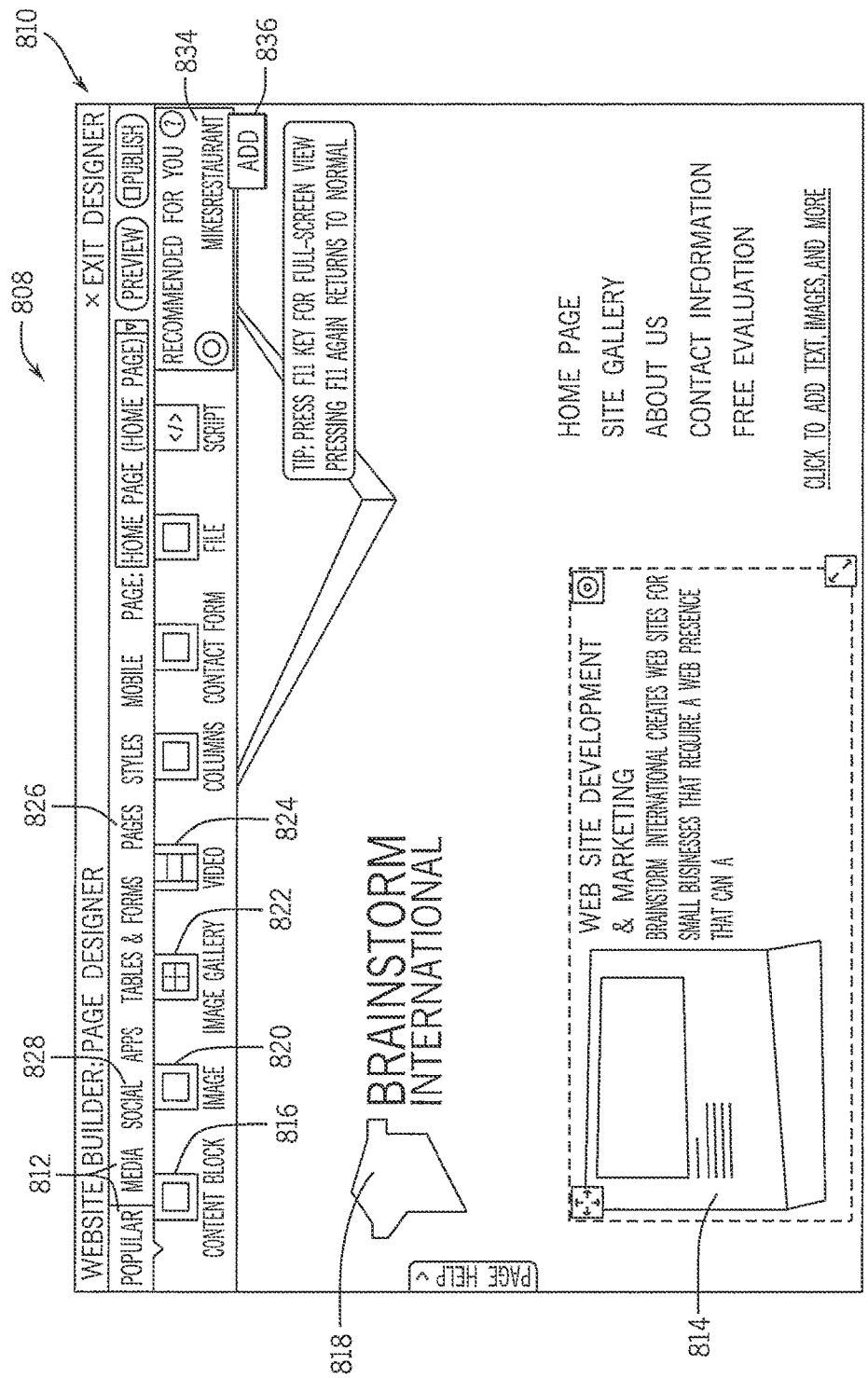
FIG. 8D is a screenshot showing a website builder user interface including a candidate domain name.

Once a candidate domain name or an alternate domain name is generated based on the keyword collection at step 322, the system 100 may provide the user 102 an option to add the domain name to their shopping cart at step 324 for purchase as part of the website builder interface. For example, FIG. 8D shows a web site builder user interface 808 (e.g., the user interface of FIG. 8A), modified to incorporate or display candidate domain name 834 that may be offered for purchase by the user. Candidate domain name 834 may be displayed on each user interface screen presented by the web site builder interface until, for example, candidate domain name 834 is either dismissed by the user, or the user decides to purchase or register the candidate domain name. Candidate domain name 834 may only be displayed in the user interface once sufficient keywords have been collected to generate a candidate domain name with sufficient confidence. With reference to FIG. 8D, the user can choose to add the candidate domain name 834 to their shopping cart by selecting an 'Add' button 836. The user will then be given an opportunity to purchase or register the domain name.

Returning to FIG. 3, at step 325, the user 102 may choose to add the candidate domain name 834 to their shopping cart by selecting an 'Add' button 836. At step 326, the user 102 may select a 'checkout' button 838 to complete their purchase of the website builder application 808 and, optionally, the domain name 834 generated at step 322.

As indicated by step 325, if the user 102 does not elect to purchase one of the candidate domain names, the method repeats and the system 100 continues providing the website builder application to the user and monitoring the user's actions. As such, additional revisions or changes to the user's website can be captured, in which case a new listing of candidate domain names may be generated and displayed for purchase by the user 102. Accordingly, if the user 102 does not elect to purchase one of the candidate domain names, the system 100 returns to step 306 to again provide the website builder application to the user and monitor whether the user 102 is updating or adding data 314 to their website. During this process, the system 100 provides the cache storage 319 in order to store the recently updated and added data 314, as well as the data acquired from third party data sources 304. In this sense, the system 100 may access the cache storage 319 to quickly generate either the candidate or alternate domain name at step 322 and provide the user 102 the option to add the domain name to their shopping cart at step 324.

In various implementations, the method illustrated in FIG. 3 may be continually executed as the user interacts with and utilizes the website builder application (or other software application). As such, the listing of candidate domain names can be continually updated as the user interacts with the software, providing new information and/or revising existing information. As such, while the user utilizes the software application, the listing of candidate domain names will continuously be refreshed and will always represent a list of potential domain names that are closely relevant to the content being supplied by the user into the software application.

Figure 4:
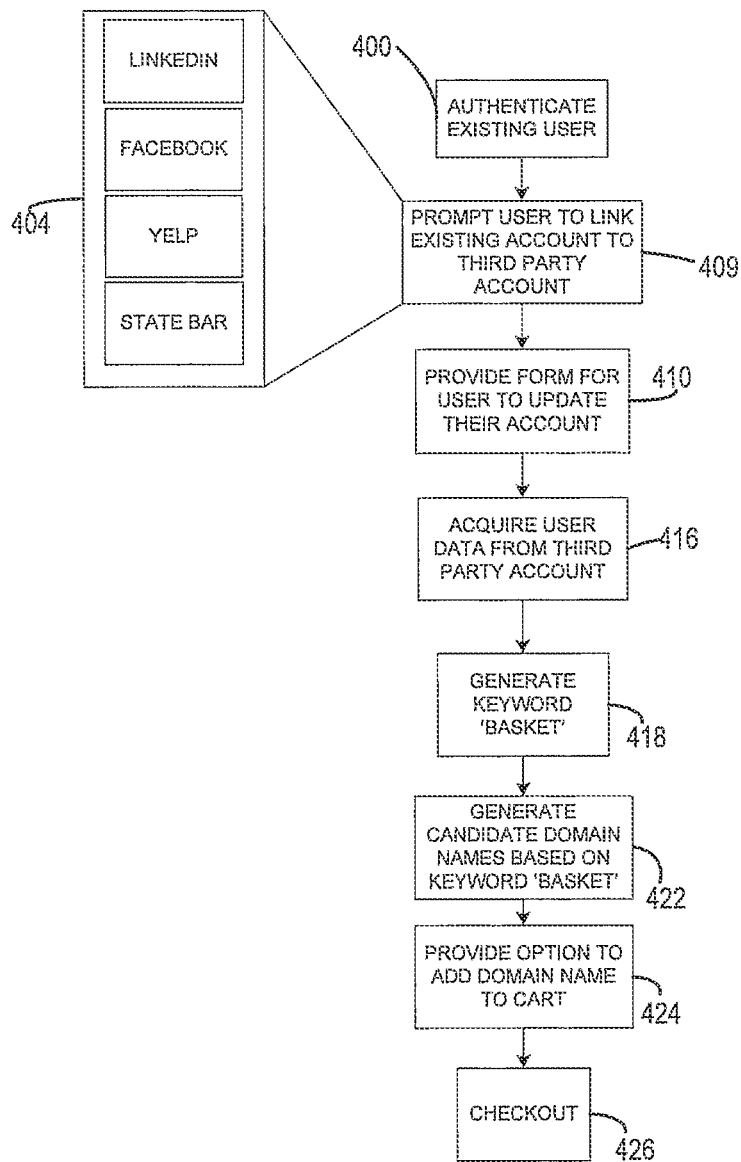
FIG. 4 is a flowchart illustrating a method for generating candidate domain names based on data received from a user and a third party data source.

Turning now to FIG. 4, a flowchart illustrating a method by which candidate domain names can be generated for the user 102 based on data acquired from third party data sources 404 is shown. The user 102 in this case may be an existing user and may begin by accessing the website 106. In step 400, the user 102 is authenticated as an existing user. Once authenticated, the user may begin using one or more software applications made available by the website 106 or may access the user's account information. While interacting with the website 106, the user 102 determines that he or she wishes to link their account to an external third party account. Accordingly, while interacting with the website 106 the user 102 may activate a user interface enabling the user to begin the process of linking their account with a third party account. The process of linking the user's 102 account with a third party account may be accomplished at a user account level.

Figure 9A:
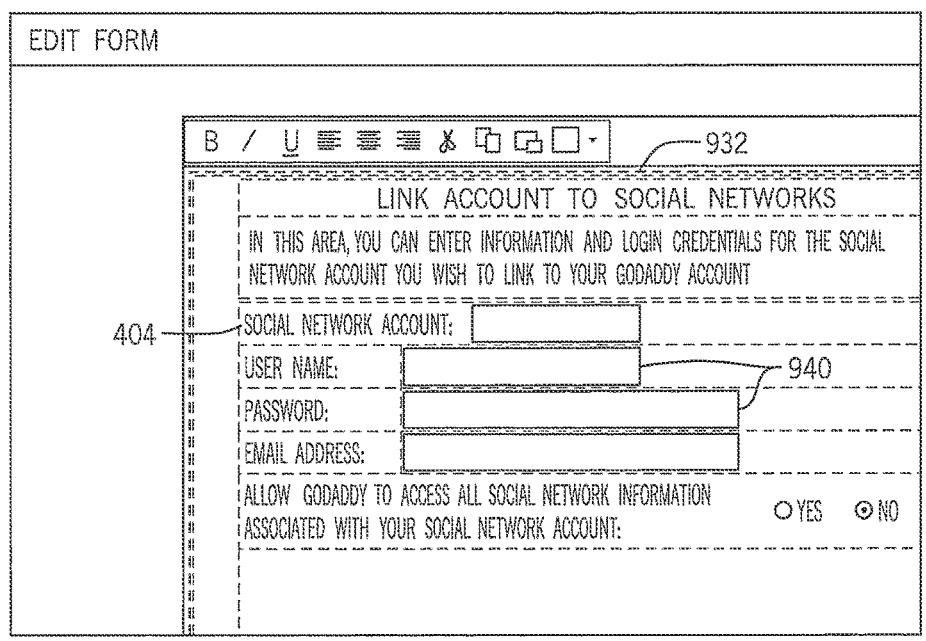
FIG. 9A is a screenshot showing an example user interface by which the requester can link a user account to a third party data source.
Figure 9B:
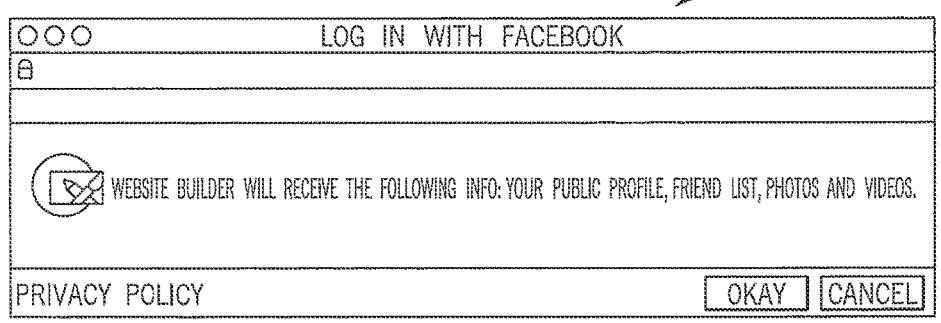
FIG. 9B is a screenshot showing an example confirmation page by which the requester can confirm linkage of their user account to the third party data source.

At step 409, the system 100 prompts the user 102 to link their existing user account to a third party account 404. As a non-limiting example, the third party account 404 may include the user's 102 LINKEDIN, FACEBOOK, YELP, State Bar or TWITTER account. At step 410, a user information form 932, as shown in FIG. 9A, is provided to the user 102. The user information form 932 may include, for example, a login window 940 that enables the user 102 to log into their third party account 404 and grant the system 100 permission to access the third party account 404. In order to link the third party account 404 (e.g., a social network account), the system 100 may use standard connection protocols provided by the third party data sources such as, FACEBOOK connect, FACEBOOK pages or LINKEDIN Company page. Alternatively, the system 100 may request that the user 102 provide their public URL to third party data sources (e.g., TWITTER handle, YELP URL). Once linked, a verification screen 942, as shown in FIG. 9B, may appear on the website of the user's 102 third party data source confirming that their user account is now linked and has access to the information provided by the third party data source. The system 100 may then acquire data about the user 102 from the newly linked third party data sources 404 at step 416. For example, the system 100 may run a search on the third party data sources 404 using the user's 102 first and last name to gather additional information about the user 102. The third party data sources 404 may include, but are not limited to, LINKEDIN, FACEBOOK, YELP, TWITTER and a State Bar directory. The system 100 may gather information from Facebook.com, for example, such as where the user 102 is from (i.e., city and state), where they are employed, what college they attended, etc.

The system 100 provides an integration module (not shown) to generate a keyword collection at step 418. The keyword collection may contain, for example, keywords related to the user 102 acquired at step 416. These keywords will be used to generate a candidate domain name for the user 102, as will be discussed in further detail below.

After the collection of keywords has been generated, the system 100 can use that collection of keywords to generate one or more candidate domain names for the user 102 that the user 102 may wish to purchase. In some cases, this will involve analyzing, in addition to the collection of keywords, websites of third parties that are relevant to the user or the user's business. In that case, the content of those third party website's can be analyzed to potentially generate additional keywords from which the candidate domain names can be generated.

In some implementations, the system 100 checks to see if the user already has a registered domain name. If so, the identification of these other domain names can be used to prevent the system 100 from suggesting candidate domain names that are too close to domain names already registered by the user 102.

Once a candidate domain name or an alternate domain name is generated based on the keyword collection at step 422, the system 100 may provide the user 102 an option to add the domain name to their shopping cart at step 424 for purchase. Step 424 may occur, for example, as the user is going through a checkout process 112 for a client software application 408 or is otherwise navigating website 106, as previously discussed. At step 426, the user 102 may checkout and purchase the domain name generated at step 422.

Figure 5:
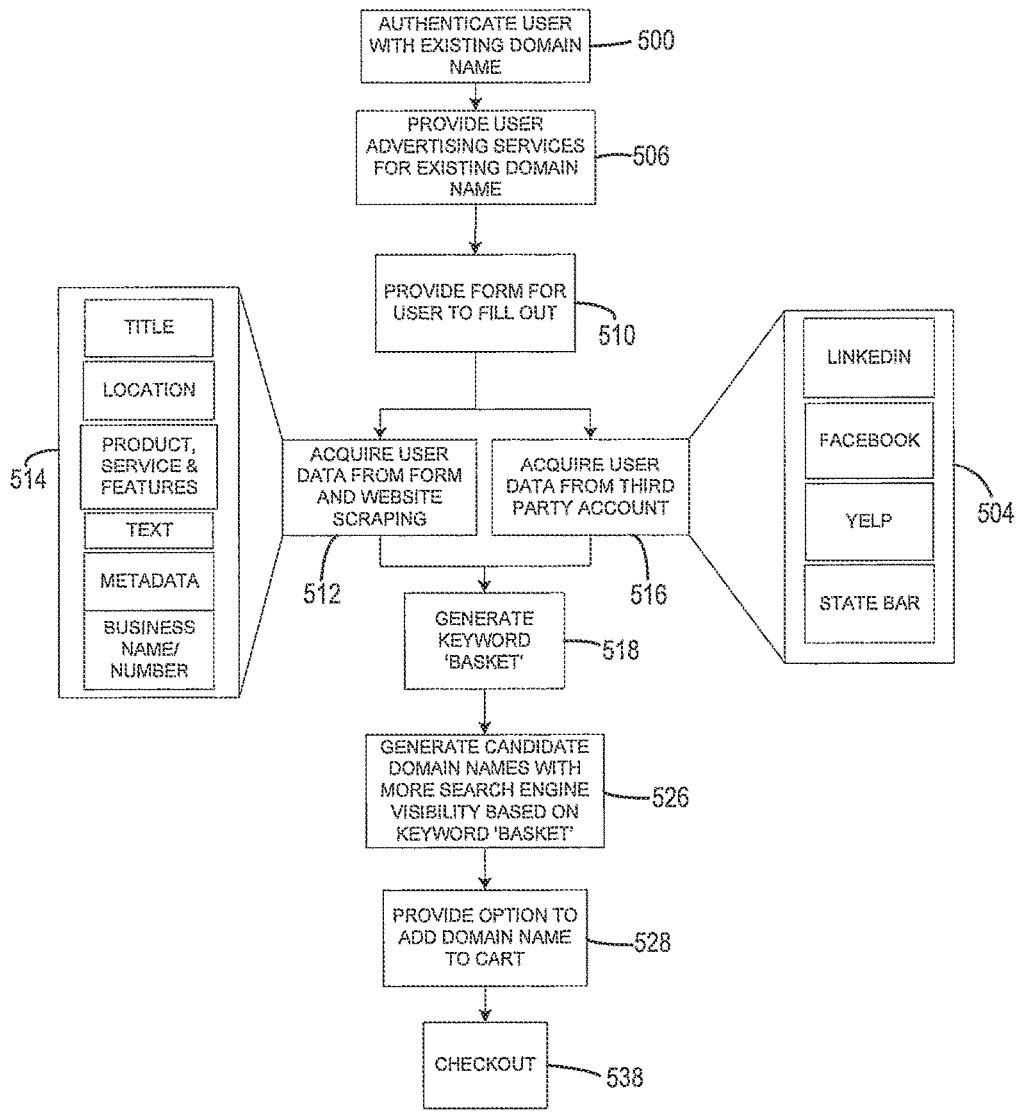
FIG. 5 is a flowchart illustrating a method for generating candidate domain names based on data relating to advertising services.

Turning now to FIG. 5, a flowchart illustrating a method by which candidate domain names can be generated for the user 102 based on input data 514 related to an advertising software application 508 or other advertising services is shown. The method shown in FIG. 5 may be useful, for example, to assist a user that already has a website, but wishes to add advertising to the website. However, the user may be unaware that the domain name that they have selected for their existing website is not particularly suited to the type of advertising that will be displayed thereon. In that case, the present method may be useful to make recommendations of improved domain names for the user that the user may wish to register at the same time the advertising services are purchased.

The user 102 in this case may be an existing user and may begin by accessing the website 106. The user 102 may be any Internet user, for example, who may wish to incorporate advertising into an existing website hosted at a particular domain name. As such, the user accesses the website 106 to execute advertising software application 508, which is configured to assist the user 102 in incorporating advertising into the user's website.

In step 500, the user 102 is authenticated as a user having an existing website. At step 506, the website 106 provides the user 102 the advertising software application 508, which allows the user 102 to add advertising features to their existing website.

Figure 10:
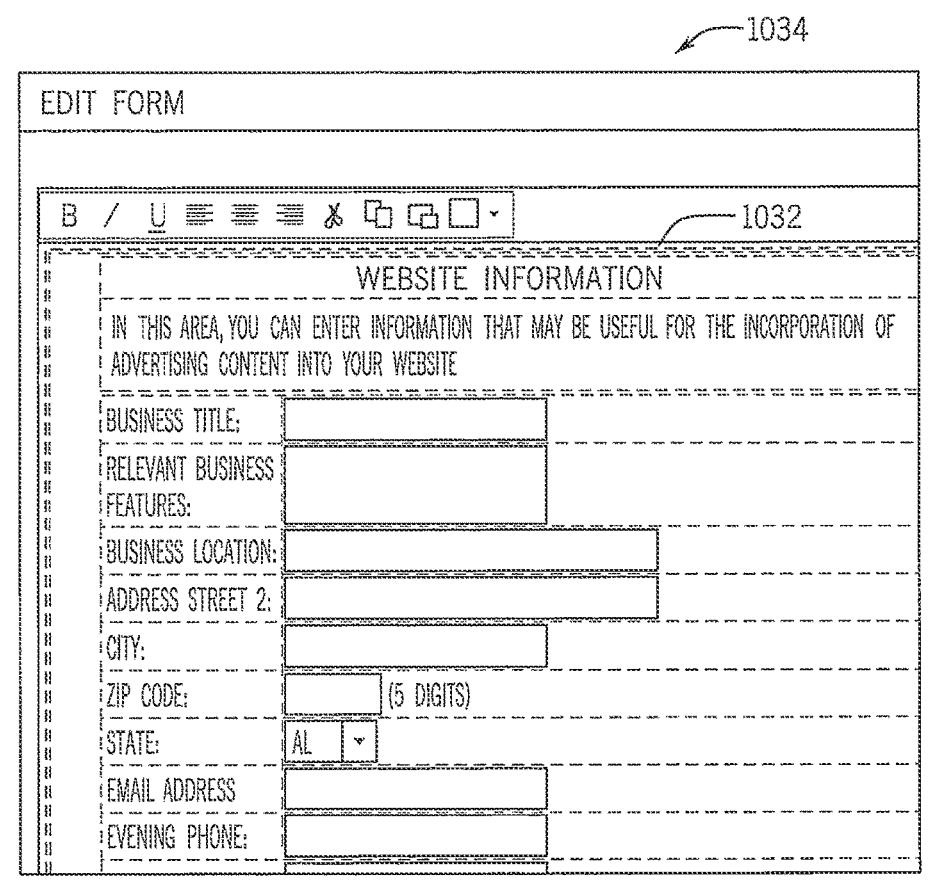

At step 510, a website information form 1032, as shown in FIG. 10, can be provided to the user 102 on a website information page 1034 requesting that the user provide information useful for the incorporation of advertising content into the user's website. The website information form 1032 may enable the user 102 to provide input data 514 that includes, but is not limited to, a title (e.g., a business name), a location (e.g., home and/or business address, city, state, zip code, etc.), a phone number, features relevant to the user's 102 products and services, email address, business website, business tagline, business category, text, and metadata such as images provided by the user 102 or the website 106 at step 512. The server 110 shown in FIG. 1 acquires data from the user 102 as the business information form 1032 is filled out. At this point, the system 100 also knows the domain name of the user's existing website and can thereby access the user's existing website to collect one or more keywords therefrom. Accordingly, at step 512, the system 100 may automatically scrape the user's 102 existing website using web scraping software capable of scraping all the pages on the user's 102 existing website to gather data including, but not limited to page titles, business location data, product features and services, metadata from images and pages, etc. to generate the keyword collection. Additionally, if an advertising campaign has been in place for some time for the web site, the collection of keywords may include keywords that are determined to have performed well in the advertising campaign.

As the user 102 is providing the input data 514, the system 100 may be configured to acquire additional data about the user 102 from third party data sources 504 at step 516. For example, if the user 102 provides their first and last name on the business information form, the system 100 may run a search on the third party data sources 504 using the user's 102 first and last name to gather additional information about the user 102. The third party data sources 504 may include, but are not limited to, LINKEDIN, FACEBOOK, YELP, TWITTER and a State Bar directory. As a non-limiting example, the system 100 may run a search on Facebook.com using the first and last name provided by the user 102. The system 100 may gather information from Facebook.com, such as where the user 102 is from (i.e., city and state), where they are employed, what college they attended, etc.

The system 100 provides an integration module (not shown) to generate a keyword collection at step 518. The keyword collection may contain, for example, keywords related to the user 102 acquired at steps 512 and 516 and generated by analysis of the user's existing website. These keywords will be used to generate a candidate domain name for the user 102, as will be discussed in further detail below.

At step 526, the system 100 generates a number of candidate domain names for the user using the keyword collection and the information collected in steps 512 and 516. In one implementation, before performing step 526, the system 100 may first determine a quality rating for the user's existing website. For example, the system may determine a search engine visibility rating, for example, of the user's 102 existing domain name based on the input data 514. The search engine visibility rating, may be a numerical rating, for example, that indicates whether the user's existing domain name is highly visible or not when other users perform queries on search engines such as, BING, YAHOO, GOOGLE, AOL, etc. If the search engine visibility rating for the user's existing domain name is sufficiently low (e.g., below a pre-determined threshold), the system 100 may generate the candidate domain names for the user 102 based on their existing search engine visibility rating and the keyword collection generated at step 518. The candidate domain names displayed will therefore be relevant to the user 102 and, specifically, the user's website. The use of any one of the domain names generated at step 526 may increase the website's traffic, and consequently, sales if the user's 102 website hosts an online store, for example.

Once the candidate domain names are generated based on the keyword collection at step 526, the system 100 may provide the user 102 an option to add one or more of the candidate domain names to their shopping cart at step 528 for purchase. Step 528 may occur, for example, as the user is going through a checkout process 112 for the advertising software application 508, as previously discussed with respect to FIG. 8C. At step 538, the user 102 may checkout and purchase the advertising services and, optionally, the domain name generated at step 526.

Figure 11:
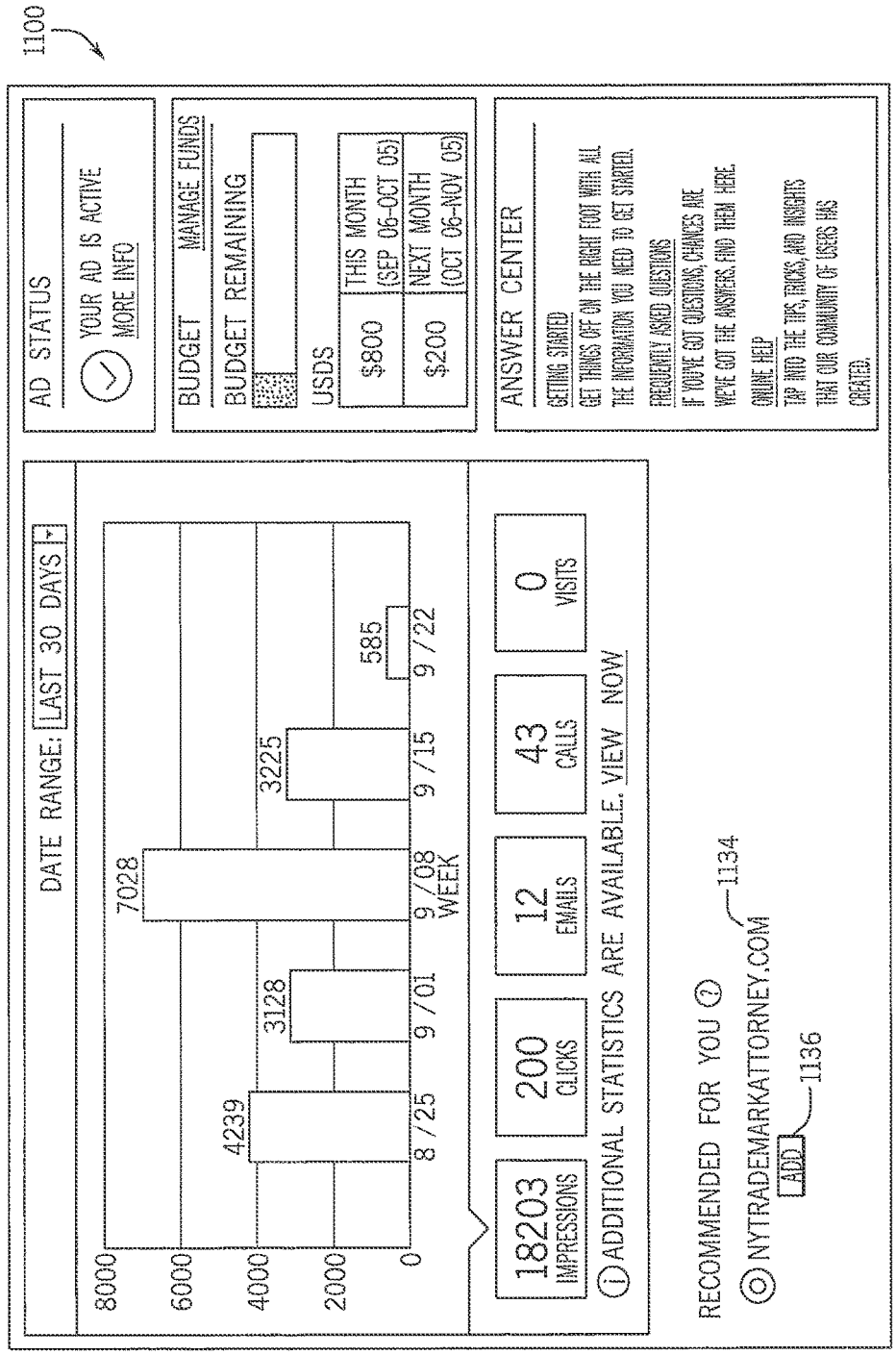
FIG. 11 is a screenshot showing an example user interface providing a dashboard of an advertising campaign and including a candidate domain name.

In some cases, the candidate domain names will be displayed on a user interface utilized by a user to monitor their advertising campaign. For example, FIG. 11 depicts user interface 1100. User interface 1100 provides a dashboard enabling a user to review the status of their current advertising or marketing campaign and provides information such as the number of impressions and clicks the web page has received, as well as a budget status of the advertising campaign. As the campaign proceeds, and certain keywords in the campaign are identified as generating increased traffic, candidate domain names can be generated based upon those successful keywords. Once generated, those candidate domain names can be provided to the user for potential purchase or registration. As such, user interface 1100 includes candidate domain name 1134. The user 102 may choose to add the candidate domain name 1134 to their shopping cart by selecting an 'Add' button 1136. The user will then be given an opportunity to purchase or register the domain name.

Figure 6:
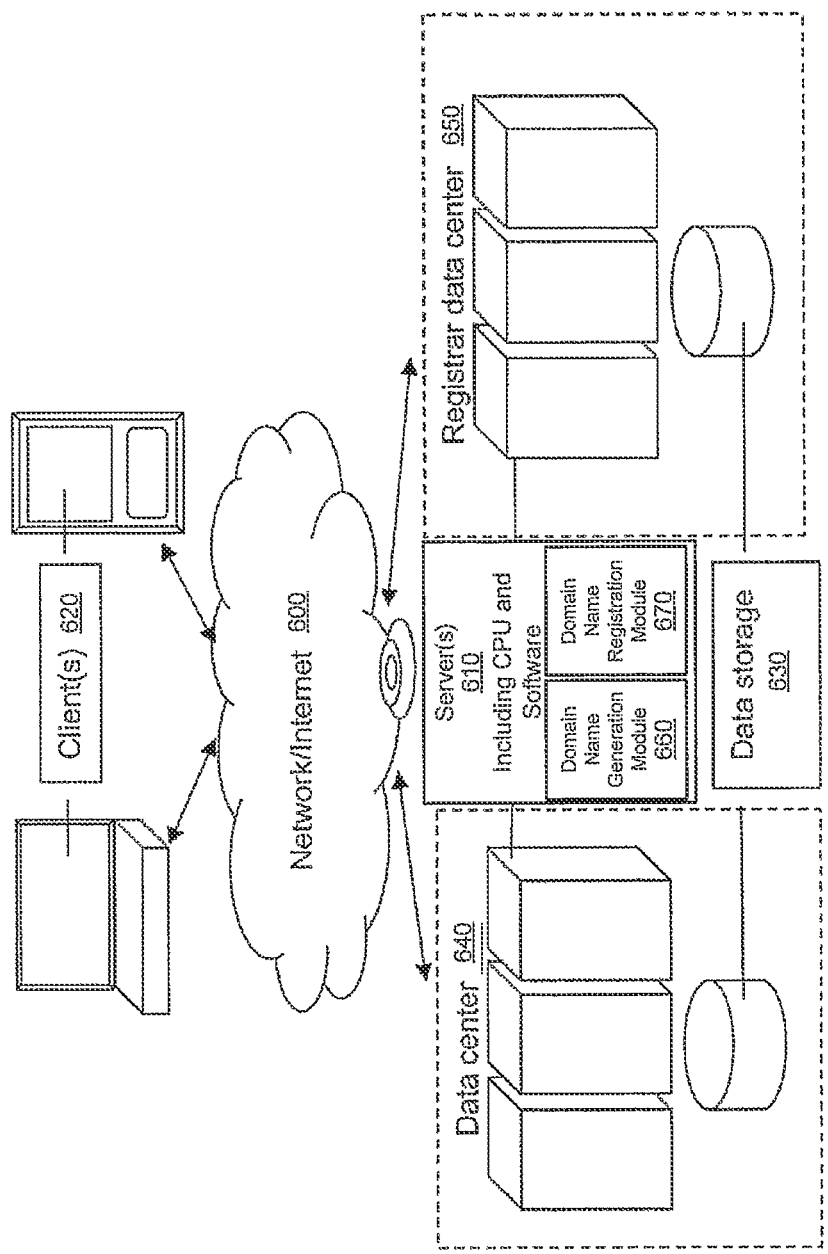
FIG. 6 illustrates a possible embodiment of a system for generating the candidate domain name.
Figure 7:
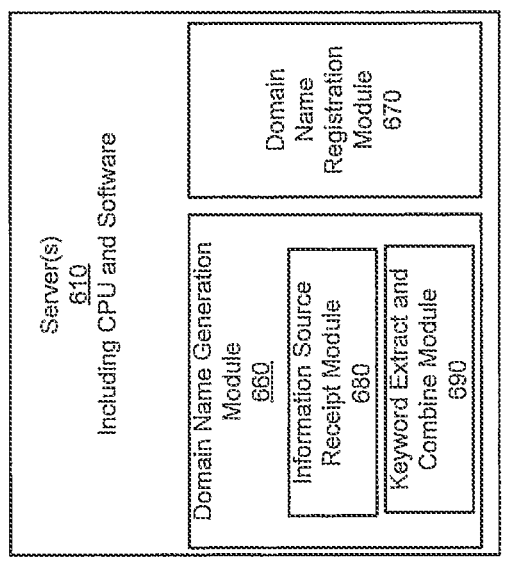
FIG. 7 illustrates a possible embodiment of a server included in the system of FIG. 6.

Several different environments may be used to accomplish the steps of embodiments disclosed herein. FIGS. 6 and 7 demonstrate a streamlined example of such an environment and illustrate a non-limiting example of a system and/or structure that may be used to accomplish the methods and embodiments disclosed and described herein. Such methods may be performed by any central processing unit (CPU) in any computing system, such as a microprocessor running on at least one server 610 and/or client 620, and executing instructions stored (perhaps as scripts and/or software, possibly as software modules) in computer-readable media accessible to the CPU, such as a hard disk drive on a server 610 and/or client 620.

The example embodiments herein place no limitations on whom or what may comprise users. Thus, as non-limiting examples, users may comprise any individual, entity, business, corporation, partnership, organization, governmental entity, and/or educational institution.

The example embodiments shown and described herein exist within the framework of a network 600 and should not limit possible network configuration or connectivity. Such a network 600 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 610 and at least one client 620 may be communicatively coupled to the network 600 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 610 and client(s) 620 (along with software modules and the data storage 630 disclosed herein) may be communicatively coupled to the network 600 and to each other in such a way as to allow the exchange of information required to accomplish the method steps disclosed herein, including, but not limited to receiving the information from a user interface on one or more clients 620, and one or more servers 610 receiving the information.

The client 620 may be any computer or program that provides services to other computers, programs, or users either in the same computer or over a computer network 600. As non-limiting examples, the client 620 may be an application, communication, mail, database, proxy, fax, file, media, web, peer-to-peer, or standalone computer, cell phone, "smart" phone, personal digital assistant (PDA), etc. which may contain an operating system, a full file system, a plurality of other necessary utilities or applications or any combination thereof on the client 620. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

The client computer(s) 620 which may be operated by one or more users and may be used to connect to the network 600 to accomplish the illustrated embodiments may include, but are not limited to, a desktop computer, a laptop computer, a hand held computer, a terminal, a television, a television set top box, a cellular phone, a wireless phone, a wireless hand held device, a "smart" phone, an Internet access device, a rich client, thin client, or any other client functional with a client/server computing architecture. Client software may be used for authenticated remote access to one more hosting computers or servers, described below. These may be, but are not limited to being accessed by a remote desktop program and/or a web browser, as are known in the art.

The user interface displayed on the client(s) 620 or the server(s) 610 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in and after FIG. 8A, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc.

The software modules used in the context of the current invention may be stored in the memory of—and run on—at least one server 610 and/or client 620. The software modules may comprise software and/or scripts containing instructions that, when executed by a microprocessor on a server 610 and/or client 620, cause the microprocessor to accomplish the purpose of the module or the methods disclosed herein.

The software modules may interact and/or exchange information via an Application Programming Interface or API. An API may be a software-to-software interface that specifies the protocol defining how independent computer programs interact or communicate with each other. The API may allow a requesting party's software to communicate and interact with the software application and/or its provider-perhaps over a network-through a series of function calls (requests for services). It may comprise an interface provided by the software application and/or its provider to support function calls made of the software application by other computer programs, perhaps those utilized by the requesting party to provide information for publishing or posting domain name and hosted website information.

The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

The software modules may also include mobile applications, possibly on a client computer and/or mobile device. These mobile applications, or "apps" may comprise computer software designed to help people perform an activity and designed to help the user to perform singular or multiple related specific tasks. It helps to solve problems in the real world by manipulating text, numbers, graphics, or a combination of these elements.

The server(s) utilized within the disclosed system 610 may comprise any computer or program that provides services to other computers, programs, or users either in the same computer or over a computer network 600. As non-limiting examples, the server 610 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof).

The server 610 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The server(s) 610 or software modules within the server(s) 610 may use query languages such as MSSQL or MySQL to retrieve the content from data storage 630. Server-side scripting languages such as ASP, PHP, CGI/Perl, proprietary scripting software/modules/components etc.

may be used to process the retrieved data. The retrieved data may be analyzed in order to determine information recognized by the scripting language, information to be matched to those found in data storage, availability of requested information, comparisons to information displayed and input/selected from the user interface or any other content retrieval within the method steps disclosed herein.

The server 610 and/or client 620 may be communicatively coupled to data storage 630 to retrieve any information requested. The data storage 630 may be any computer components, devices, and/or recording media that may retain digital data used for computing for some interval of time. The storage may be capable of retaining stored content for any data requested, on a single machine or in a cluster of computers over the network 600, in separate memory areas of the same machine such as different hard drives, or in separate partitions within the same hard drive, such as a database partition.

Non-limiting examples of the data storage 630 may include, but are not limited to, a Network Area Storage, ("NAS"), which may be a self-contained file level computer data storage connected to and supplying a computer network with file-based data storage services. The storage subsystem may also be a Storage Area Network ("SAN"-an architecture to attach remote computer storage devices to servers in such a way that the devices appear as locally attached), an NAS-SAN hybrid, any other means of central/shared storage now known or later developed or any combination thereof.

Structurally, the data storage 630 may comprise any collection of data. As non-limiting examples, the data storage 630 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

As seen in FIG. 6, the server(s) 610 and data storage 630 may exist and/or be hosted in one or more data centers (640, 650). These data centers 640/650 may provide hosting services for websites, services or software relating to stored information, or any related hosted website including, but not limited to hosting one or more computers or servers in a data center 640/650 as well as providing the general infrastructure necessary to offer hosting services to Internet users including hardware, software, Internet web sites, hosting servers, and electronic communication means necessary to connect multiple computers and/or servers to the Internet or any other network 600. These data centers 640/650 or the related clients 620 may accept messages from text messages, SMS, web, mobile web, instant message, third party API projects or other third party applications.

As users access and/or input information, this information may be redirected and distributed between and among the data centers (640, 650) via commands from any combination of software modules hosted on the server(s) 610 and executed via processors on the server(s) 610. This information may then be accessed and manipulated by the combination of software modules or stored in the data storage 630 of any of a plurality of data centers, either separate from or integrated into the one or more servers, so that the information is available to be searched and accessed by the user and/or any other components of any or all data centers.

Any references to "software combination," "combination of software," "combination of software modules" etc. referred to herein may include any combination of software modules executed by a microprocessor on either the server 610 or client 620 computers. These software modules may also be used in combination with any other hardware or software structures disclosed herein. The servers 610 may be hosted in any data center (640, 650) operated by any hosting provider such as those disclosed herein and the servers 610 and clients 620 may be operated by any users disclosed herein.

The system also may comprise a domain name generation module 660 that may be stored in the memory of—and run on—at least one server 610 and may comprise any software and/or scripts containing instructions that, when executed by the server's 610 microprocessor, cause the microprocessor to generate a domain name relevant to the keyword collection. As illustrated in FIG. 7, the domain name generation module 660 may comprise an information source receipt module 680 and a keyword extraction and combination module 690. The information source receipt module 680 may comprise scripts and/or software running on the server 610 that operates to obtain a plurality of data from any information source. As described in detail above, the information source forming the basis of generated domain names may comprise any collection of data, accessible to the domain name generation module 660 that may contain data regarding the user and/or the user's business, for example, including, but not limited to websites, web pages, news feeds, and/or Real Simple Syndication (RSS) feeds.

The keyword extraction and combination module 690 also may comprise software and/or scripts running on the server 610 and may operate to parse received data into a plurality of keywords, combine keywords into a root name, and concatenate a top level domain to the root name, thereby generating the candidate or alternate domain name. In one possible embodiment, the keyword extraction and combination module 690 also may determine a topic to which each keyword relates, sort the keywords into subcategories according to topic, and generate a root name by combining keywords from the same subcategory. A domain name relevant to the keyword collection is thereby generated after a TLD is concatenated to the root name. Modules 680 and 690 may comprise any software and/or scripts running on the server 210 that may accomplish the methods described in detail above.

The system also may comprise a domain name registration module 670 running on at least one server 610 and offering the generated domain name for registration (if available). This module may comprise software and/or scripts containing instructions that, when executed by the server's 610 microprocessor, cause the microprocessor to determine whether the domain name is available for registration and provide the domain name for registration, if available. Additionally, the domain name registration module 670 may, if the domain name is available, register the domain name to the registrant. It may comprise any domain name registration system known in the art or developed in the future including, but not limited to, a website enabled domain name purchase and registration system, such as that described in detail above and/or may be available on GODADDY.COM's website. The domain names database may comprise, as non-limiting examples, a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

In some embodiments, any or a combination of the above-described systems and methods may be implemented and, if necessary, modified to generate one or more sets of candidate domain names for presentation to and possible purchase by the user. The member domain names of each set may be related to each other according to a theme that may also be identified for the user in the presentation of the sets. A "theme" in this context may be any characteristic or combination of characteristics that is/are common across a plurality of generated candidate domain names and potentially relevant to the user's website. Generally, a theme may describe either a characteristic of a domain name (e.g., "Websites with a .org TLD"), a characteristic of the user's website to be hosted at or accessible from the domain name (e.g., "Mountain bike website" or "online store"), a characteristic of the user itself (e.g., "Nonprofit organization" or "Phoenix area business"), or a combination of such characteristics (e.g., "Mountain bike online store"). Non-limiting examples of themes, some of which are used in additional examples below, include:

- domain name characteristics, such as availability for purchase, common or synonymous TLD or gTLD, international designations (e.g., .in ccTLD or keyword "india" in second level or lower), character length, spelling variations (e.g., misspellings of a searched or selected domain name), inclusion of common (category-independent) keywords, and analytics (e.g., relevance to each other or to a seed domain name, amount of traffic, number of previous searches or owners, theme-related pricing and purchase history, and the like);
- website characteristics, such as category or business vertical, type of content, keyword selection and frequency, and analytics (e.g. search engine optimization, keyword analysis such as usage on similar website and advertising velocity, and the like); and
- user characteristics, such as user or business name, business address(es), location, purchase history, ownership of other domain names, usage of other products offered by hosting provider, other input data and additional data from third party sources as described above, and the like.

In some embodiments, one or more characteristics of each theme may be chosen in advance of generating the candidate domain names, and the candidate domain names may then be generated using the theme as input data or additional data in accordance with the above methods. The generated results may then be stored in the set associated with the theme used for generating them. In other embodiments, the candidate domain names may be generated without using a theme as input, and the candidate domain names may be added to each themed set in a subsequent process.

The candidate domain name generation may be performed during a "domain search," in which the user attempts to identify one or more available domain names to purchase and/or use. In such a scenario, the input data used to generate candidate domain names may be a primary domain name desired by the user for hosting one of the user's websites (e.g., the website being built in the website builder application 808 of FIG. 8C). The input data may also or alternatively be one or more keywords relevant to the user's website or to the user's desired primary domain name (i.e., when the user does not know what to use as the primary domain name). The system 100 may use the primary domain name and/or the provided keywords to generate a plurality of candidate domain names that are relevant to the input data (i.e., domain search terms).

The candidate domain names may correspond to one or more themes that are predetermined or preselected before the candidate domain names are generated, or are identified as relevant themes during or after the candidate domain name generation process. The themes may be identified by the system 100 as likely relevant to the user. Relevant themes may initially include themes that are commonly available to all users and are not dependent on the input data or any other data unique to the user, such as "common TLDs" (referring to a themed set that includes .com, .org, .net, and .us candidate domain names). The system may expand or refine the themes to include themes that are relevant to the particular user, such as by analysis of the input data or of any additional data relevant to the user and identified by the system 100 as described above. For example, where the user has entered contact information or created a website identifying the user's entity as a photography studio, the system 100 may analyze the contact information and add themes such as "photography" and "art." The themes may include themes actually selected by the user via an interface, and may exclude themes not so selected. In one example, the system 100 may display to the user a list of available themes and receive the selection of themes from the user before generating the candidate domain names.

The system 100 may alternatively or additionally use another method different from those described herein to generate the candidate domain names. The system 100 may arrange the candidate domain names into the themed sets using any classification process described herein, or a different process. Once the candidate domain names are arranged into the themed sets, the system 100 may present one or more of the sets to the user in a user interface for selection and purchase, or for dismissal if the user is not interested in them.

In some embodiments, the system 100 may have stored thereon or have electronic access to pre-set themes used to create sets and/or bundles of candidate domain names as described below. The system 100 may be configured to dynamically generate themed domain name bundles based on relevance to the domain name or keywords entered by the user, or to a domain name suggested by the system in response to the domain name search and selected by the user. In the latter instance, if the user picks a suggested domain name, the system 100 may be configured to analyze one or both of the user query and the selected domain name to identify what the user selected, and perhaps what the user intended to purchase. Such analysis may include identifying relevant pre-stored themes. For example, if the system 100 suggests and the user selects a domain name with a TLD that is a synonym of an input keyword, the system 100 may identify a "keyword synonym" theme as relevant to the user. In another example, if the user selects a suggested domain name below a certain price point (e.g., less than $10), the system 100 may identify a "value" theme for lower cost domain names. The system 100 may rank the identified theme higher than other themes. The system 100 may use a relevance score, as will be described in further detail below, to prioritize relevant themes. This is advantageous over conventional domain name bundles that are typically provided as a single list where the user is not allowed to pick the most relevant set. However, the system 100 and method described herein provides the ability to create relevant and discounted domain name bundles in real time, as will be described below.

Figure 12:
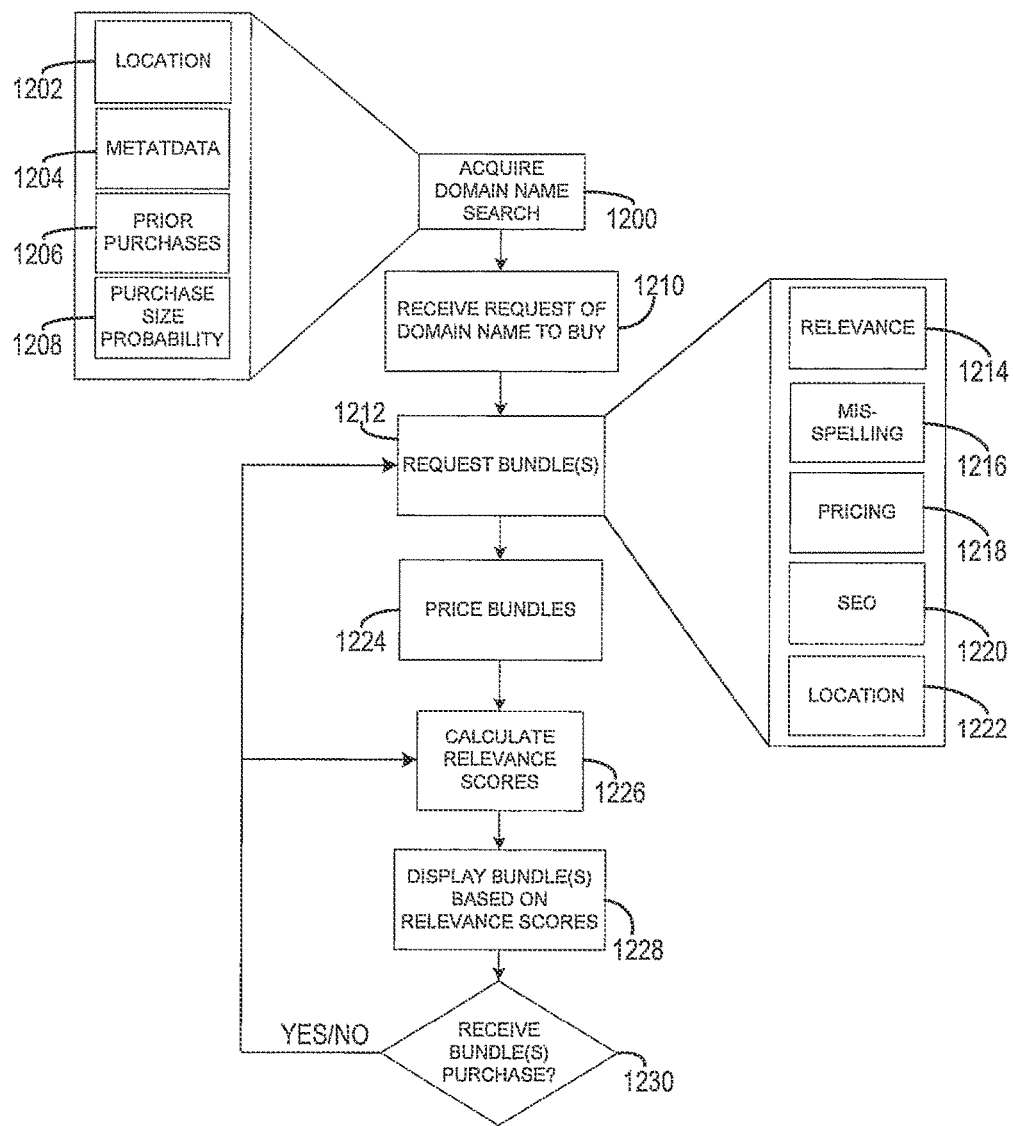
FIG. 12 is a flowchart illustrating a method for generating candidate domain name bundles based on a domain name search.

Referring to the flow chart of FIG. 12, a method by which candidate domain name bundles can be generated for the user 102 based on an input domain name for purchase is shown. The method begins at step 1200 where the system 100 acquires a domain name search from the user. In one non-limiting example, the domain name can be searched on a website, such as the exemplary website 1300 shown in FIG. 13, where the user may input a domain name 1302 in a search bar 1304 on a user interface 1306 of the website 1300. For example, the domain name 1302 searched for is "filmsnotdead.com".

Returning to FIG. 12, as the system 100 acquires input data, in the form of the domain name search, from the user 102 (step 1200), additional data related to the user 102 may be captured. For example, a location 1202 relative to the user 102 may be acquired based on information previously explicitly received by the user 102, such as a home and/or business address, city, state, zip code, etc. Additionally or alternatively, if the user 102 is a new user, for instance, the location 1202 may be determined from implicit information gathered from the user's 102 usage, such as the IP address of the user's device. The location 1202 may then be utilized by the system 100 to generate relevant domain name bundles for the user 102 to purchase, as will be described in further detail below.

Metadata 1204 may also be acquired by the system 100 as the domain name search is acquired at step 1200. Metadata 1204 may be describe one or more instances of data related to the user. Some examples of such metadata 1204 may include, but are not limited to, user preferences (e.g., preference of ccTLD, gTLD, or traditional TLD; sub-domains or sub-directories created as well as destination of redirect created), price sensitivity of the user (e.g., user purchases domains less than $10 or greater than $25), prior purchase patterns of the user (e.g., the user never purchases a particular TLD, ccTLD, or gTLD), past purchase probability of the theme, the user type (e.g., small business, domain investor, and the like), user renewal probabilities of domain names with a bundle, and the user's website content such as keywords, web page or image file names, web page metadata or header information, and the like. The metadata 1204 for an existing user may also describe structures of the user's data, such as existing or previous website layouts, subdomain or domain directory hierarchies arranged for serving certain web content via domain names already in the user's account, and the like. The system 100 may use the data to identify relevant themes and/or domain naming conventions favored by the user 102.

In addition, if the user 102 is an existing user, the system 100 may be configured to acquire data related to prior purchases 1206, such as prior domain names, made by the user 102. The data related to the prior purchases 1206 may then be utilized by the system 100 to generate relevant domain name bundles for the user to purchase. For example, if the user 102 consistently purchases domain names related to a restaurant theme, the system 100 can track the historical purchases and generate domain name bundles related to restaurant themes, as opposed to generating domain name bundles related to an artist theme, for example. The data related to prior purchases 1206 may also include revenue data (i.e., how much the user paid for a particular domain name) that can be utilized by the system 100 to accurately price and generate relevant domain name bundles for the user.

Similarly, data related to a probability of the purchase size 1208 may be generated as the domain name search is acquired at step 1200. The purchase size probability 1208 may be a numerical value (e.g., a percentage), an estimated quantity of domain names to be purchased, or an estimated price the user will pay for one or more domain names. In one example, if the user 102 is an existing user, the system 100 may access previously acquired data related to the user's 102 domain name purchase history. The domain name purchase history may include, but is not limited to, prices of previously purchased domain names from the user, quantity of previously purchased domain names, prices and quantities of domain names that were presented to the user on the website 1300 (see FIG. 13) but not purchased, and the like. The system 100 can then use the historical data to generate the purchase size probability 1208 corresponding to the user 102. In contrast, if the user 102 is a new user, the purchase size probability 1208 may not be generated, however based on the information describing some or all of the user's interactions with the interface 1306, the system 100 can generate the purchase size probability 1208 for subsequent domain name purchases from that user.

Figure 13:
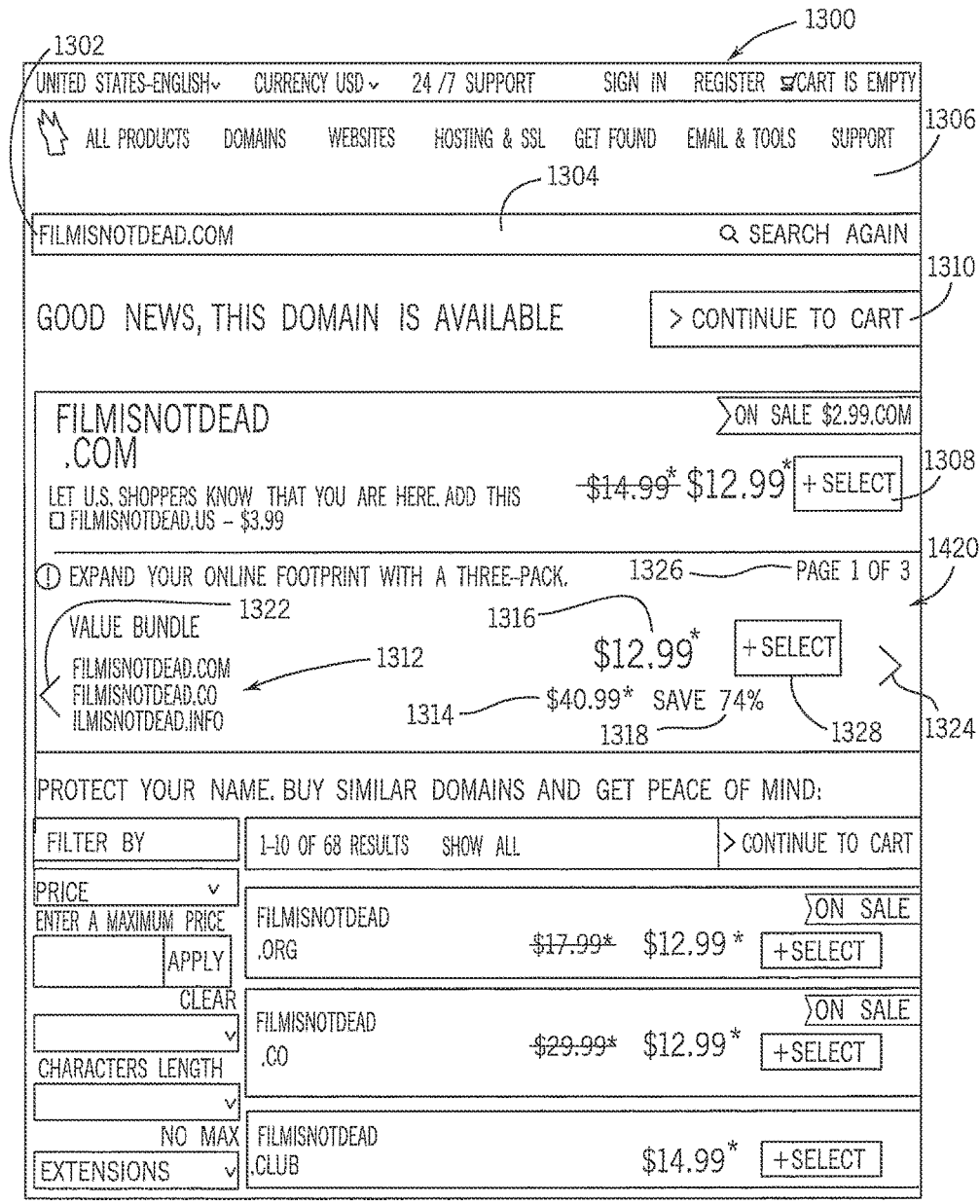
FIG. 13 is a screenshot showing an example checkout page user interface including a single bundle carousel.

Once the domain name search and related data is acquired at step 1200, the system 100 may receive a request from the user to purchase the searched domain name at step 1210. For example, as shown in FIG. 13, the searched domain name 1302 is indicated as being available on the user interface 1306 of the website 1300. A 'select' button 1308 and one or more lines of additional textual or graphical information about the desired domain name 1302, such as the purchase price, may be presented to the user on the user interface 1306. Once the user has selected the 'select' button 1308 a 'continue to cart' button 1310 may be selected by the user to complete the domain name purchase, for example. Upon selection of the 'select' button 1308, the user may be presented with one or more domain name bundles 1312 for each domain name that was added to the cart.

However, prior to displaying the relevant domain name bundles 1312, the system 100 may request the domain name bundles 1312 at step 1212, as shown in FIG. 12, to display to the user. The system 100 may request the domain name bundles 1312 from a source outside of the system 100. The system 100 may generate the domain name bundles before requesting them at step 1212, in which case the "request" may be a query to one or more internal databases. Or, the system 100 may generate the domain name bundles as part of the request of step 1212. Various methods may be used to generate the candidate domain name bundles presented to the user. In one non-limiting example, relevance bundles 1214 based on the domain name characteristics may be requested at step 1212. The system may generate candidate domain names for the relevance bundle 1214 by taking one or more keywords from the searched domain name's SLD and inserting the one or more keywords into the TLD. For example, if the selected domain name for purchase is 'theresaskitchen.com', the system may take the keyword 'kitchen' from the SLD and move it to the TLD to arrive at the candidate domain name 'theresas.kitchen' for the relevance bundle 1214.

In another non-limiting example, the system 100 may generate candidate domain names for the relevance bundle 1214 by generating synonyms of keywords identified in the SLD, gTLD, TLD, and the like. For example, if the selected domain name for purchase is 'theresaskitchen.com', the system may replace the word 'kitchen' with 'café ' to arrive at the candidate domain name 'theresascafe.com' for the relevance bundle 1214. In yet another non-limiting example, the system can create any combination of domain name formats (e.g., SLD.TLD, SLD.gTLD, SLD.ccTLD, etc.) for the candidate domain names included in the relevance bundle 1214. For example, if the selected domain name for purchase is 'mycookingchannel.com', the system can identify the dominant themes as 'food', 'television', and 'personal', and a bundle of one or more candidate domain names may be created for the relevance bundle 1214. The candidate domain names name include, but are not limited to, 'mycookingchannel.food' (category=food), 'mycookingchannel.menu' (category=food), 'mycookingchannel.recipe' (category=food), menu.mycookingchannel.com (category=food), 'mycookingchannel.tv' (category=tv), 'mycookingchannel.me' (category=personal), and the like.

With continued reference to FIG. 12, another method for generating candidate domain names for the user is the use of spelling variation bundles 1216. In one non-limiting example, spelling variation bundles 1216 based on the domain name characteristics may be requested by the system at step 1212. The system may generate candidate domain names for the spelling variation bundle 1216 by identifying misspelled versions of the SLD in the selected domain name and suggest alternative misspelled SLDs to the user. Additionally or alternatively, the system may identify misspelled TLDs in the searched domain name and replace the TLD with the implied and/or alternate TLD. The system 100 may be configured to access a database, such as the database 630 of FIG. 6, having stored thereon a list of common misspellings. Thus, as the system 100 analyzes the components of the searched domain name, common misspellings can be identified and synonymous alternatives can be acquired from the database.

For example, if the user searches for "Queens rental accommodations", the system may recognize that the implied SLD is '.com'. Thus, the system may generate candidate domain names for the spelling variation bundle 1216 that include various spellings of the words 'accommodations' or 'rental' for example. The candidate domain names may include, but are not limited to, 'QueensRentalAcommodations.com' (single 'c' in the word 'accommodations'), 'QueensRentalAccomodations.com' (single 'm' in the word 'accommodations'), 'QueensRentelAccommodations.com' (usage of 'e' in the word 'rental' instead of the letter 'a'). Similarly, if the user purchases the searched domain name at step 1210, and the purchased domain name includes one or more misspelled words, as identified by the system, the candidate domain names in the spelling variation bundle 1216 may include domain names with the implied spelling. For example, if the user purchases the doming name 'QueensRentelAccomodation.com', where both 'rentel' and 'accomodation' are misspelled, the system may generate one or more candidate domain names, such as, 'QueensRentalAcommodations.com' (single 'c' in the word 'accommodations') and 'QueensRentalAccomodations.com' (single 'm' in the word 'accommodations'). Additionally, or alternatively, the system may also generate a candidate domain name for the spelling variation bundle 1216, such as 'QueensRentalAccommodations.rent' substituting the TLD '.com' with a gTLD '.rent'.

Another method for generating candidate domain names for the user is the use of pricing bundles 1218, as shown in FIG. 12. The system may generate candidate domain names for the pricing bundle 1218 by providing, for example, a price-discounted bundle of domain names to the user. In one example, the website 1300 of FIG. 13 may merge available TLDs that are known to the system as being "on sale" with the TLDs that are available for discounting when merged with purchases for a specific TLD. For example, if the user searches for 'mycookingchannel.com', the discounted pricing bundle 1218 may include, for example three candidate domain names (e.g., 'mycookingchannel.co', 'mycookingchannel.net', and 'mycookingchannel.biz') for a price-discounted bundle of $19.99 if all three candidate domain names are purchased with the searched domain name, for a total of four domain names.

In one example, the system 100 may be configured to analyze the retail price and actual costs of each domain name known to the system. Algorithms controlled by the system can then dynamically discount one or more domain names in the bundle based on various input data. The input data may include, but is not limited to, renewal probability, competitor pricing, and relevance of the domain name in the bundle to the domain name being purchased by the user. Thus, various combinations of domain names are created and ranked by the system based on overall relevance, discount and price. The top N ranked domain name bundles may then be presented to the user in the purchase flow.

With continued reference to FIG. 12, another method for generating candidate domain names for the user is the use of search engine optimization (SEO) bundles 1220. SEO bundles 1220 based on the website characteristics may be requested by the system at step 1212. The system may generate candidate domain names for the SEO bundle 1220 by utilizing a SEO strategy implemented by the system 100. In one non-limiting example, search engine data, such as keywords searched by the user on the website (e.g., website 1300 in FIG. 13), may be consumer related data obtained and used by the system to generate the SEO strategy. The SEO strategy may include, for example, generating a list of specific keywords based upon some, or all, of the data obtained at process blocks 1200 and 1210. For example, in the case where the user searches for domain names related to a 'food' theme, the system may determine that the keywords searched by the user, as well as synonymous and alternatives to the keywords searched, may be candidate keywords to include in the domain names contained in the SEO bundle 1220.

For example, the system may determine that keywords searched by the user, such as "restaurant" and "chicken" are adequate keywords to include in the SEO strategy. These searched keywords may be good candidates for the domain names in the SEO bundle 1220 because they can target consumers that are searching for the offering provided by the user. Additionally, or alternatively, the keywords can be based on the location 1202, metadata 1204, prior purchase data 1206, or any other data obtained at steps 1200 and 1210. Thus, the system can create SEO bundles 1220 that include domain names that improve the value of user's primary domain from an SEO perspective.

Yet another method for generating candidate domain names for the user is by utilizing location bundles 1222, as shown in FIG. 12. The system may generate candidate domain names for the location bundles 1222 by providing, for example, a domain name bundle relevant to the user's location, as determined by the system. The system may identify a location (e.g., city, state, country, and the like) of the user searching for a domain name by acquiring an IP address, for example, of the device being used to access the website 1300. Additionally, or alternatively, the system may identify a location of the user if, perhaps, the searched keywords include a specific city, state, country and the like. Thus, if the system 100 determines that the user is located in India, for example, the location bundle 1222 may include candidate domain names relevant to India.

In one instance, the candidate domain names in the location bundle 1222 may include, but are not limited to, ccTLDs, TLDs with location data in the SLD or TLD, for example. One specific example would be if the user searches for "organic plant pizza" from an IP address in Queens, N.Y., the system may generate candidate domain names that include SLD location variations such as, 'QueensOrganicPizza.com', 'QueensOrganicPizza.nyc', 'OrganizPizza.com', 'OrganicPizza.nyc', 'Brooklyn Pizza.com', 'BrooklynPizza.nyc', 'BronxPizza.com', 'BronxPizza.nyc', 'ManhattanPizza.com,' 'ManhattanPizza.nyc', or any combination thereof.

In another instance, the system 100 may be configured to generate candidate domain names for the location bundle 1222 that include internationalized domain names (IDN). The system 100 may generate a location bundle 1222 of relevant IDNs for a user visiting the website (e.g., website 1300 of FIG. 13) whose default language matches an IDN language. For example, if the user visits the website 1300 from an India IP address and searches for 'Bandra morning walk group' in the search box 1304, the system may generate a location bundle 1222 of candidate domain names that includes, for instance, 'BandraMorningWalkGroup.XXX' (where XXX is the Hindi TLD for '.org'), 'BandraMorningWalkGroup.YYY' (where YYY is the Hindi TLD for '.com'), and 'BandraMorningWalkGroup.ZZZ' (where ZZZ is the Hindi TLD for '.net').

One or more of the above identified methods for generating candidate domain names for domain name bundles, as discussed with respect to blocks 1214, 1216, 1218, 1220, and 1222, may be utilized by the system 100 to provide the most suitable combination of domain name bundles to the user. However, prior to presenting the domain name bundles to the user, the system 100 may price each of the bundles at step 1224 according to one or more pricing strategies.

In one non-limiting example, the system 100 may compute, or use an external source via API to compute, a price and/or savings for the domain name bundle (e.g., the domain name bundle 1312 shown in FIG. 13). An API, such as a merchandising API, can return a retail price 1314, a bundle price 1316, and a bundle savings value 1318, as shown on the user interface 1306 of the website 1300 (see FIG. 13). The retail price 1314 may be displayed on the user interface 1306 as a numerical value, for example, representative of the sum of retail prices of the domain names included in the bundle 1312. The bundle price 1316 may be displayed on the user interface 1306 as a numerical value, for example, representative of a discounted price as compared to the retail price 1314. The bundle savings value 1318 may also be displayed as a numerical value on the user interface 1306, representative of a percentage of savings between the retail price 1314 and the bundle price 1316. In one instance, the system 100 may be configured to calculate the bundle savings value 1318 according to the following equation:

$$\text{Bundle savings value} = (1 - (\text{Sum of bundle price}/\text{Sum of retail prices}))\% \quad (1)$$

Thus, as shown in FIG. 13, the bundle savings value 1318 for the domain name bundle 1312 is 74%, the bundle price 1316 is $12.99, and the retail price 1314 is $49.97. According to equation (1) above, $(1-(12.99/49.97))\% = 74\%$. The system 100 may further be configured to perform retail price and site price lookup to determine if the bundle 1312 is valid, prior to displaying the bundle 1312 to the user. In one example, the domain name bundle 1312 is determined to be valid if the bundle price 1316 is less than, or equal to, the retail price 1314. Thus, using the above example, where the bundle price 1316 is $12.99 and the retail price 1314 is $49.79, the bundle price 1316 is less than the retail price 1314, therefore, the domain name bundle 1312 is valid. However, if the bundle price 1316 is greater than the retail price 1314, the system will reject the domain name bundle 1312 and not display it to the user for purchase.

Once the domain name bundles 1312 are priced and/or discounted at step 1224, the system 100 may be configured to calculate one or more relevance scores for the domain names at step 1226. By calculating relevance scores for each of the domain names in the bundle, the system can determine a suitable order for presenting the domain name bundles to the user. Relevance scores may be based on, for example, similar domain names and/or domain name bundles that have already been purchased, by another user. In one example, the relevance score may be calculated by identifying website traffic data related to the domain name. The website traffic data may be a numeric value of the quantity of internet users visiting the website. The quantity of internet users visiting the website may be obtained through traffic statistics identified in a log file (not shown) stored on the server 110 (see FIG. 1), for example. Additionally, or alternatively, the website traffic data may be obtained by a tracking application external to the website that is configured to record traffic by inserting tracking code in the website pages. Thus, a higher value of website traffic may be related to the a higher relevance score of the website, and similar domain names can then be recommended for the candidate domain names in the bundle.

Click through rate (CTR) data and/or sales data may also be used to identify the relevance score at step 1226 for similar domain names. In one example, the sales data may be acquired for the domain name, and may be a numeric value of the quantity of product sold and/or the dollar amount corresponding to the quantity of product sold on the website. Thus, a higher value of sales data may be related to a higher relevance score for the domain name, and the system 100 may then be configured to display candidate domain names in the bundle to the user with similar characteristics (e.g., domain name characteristic, website characteristics, etc.) to previously purchased domain names having high relevance scores.

Additionally, or alternatively, the relevance score calculated at step 1226 may be, for example, a search engine visibility rating, for example, of the user's 102 existing domain name based on the input data. The search engine visibility rating, may be a numerical rating, for example, that indicates whether the user's existing domain name is highly visible or not when other users perform queries on search engines such as, BING, YAHOO, GOOGLE, AOL, etc. If the search engine visibility rating for the user's existing domain name is sufficiently low (e.g., below a pre-determined threshold), the system 100 may generate the candidate domain names for the domain name bundles based on their existing search engine visibility rating. The candidate domain names displayed will therefore be relevant to the user and their domain name.

Based on the relevance scores for each domain name in the bundle, the system 100 may be configured to take an average of the relevance scores calculated at step 1226. In one example, the higher the calculated average of the relevance scores in a domain name bundle, the higher the domain name bundle will be ranked. Thus, the higher ranked domain name bundles will be displayed to the user prior to lower ranked domain name bundles on the user interface 1306 (see FIG. 13).

Figure 14:
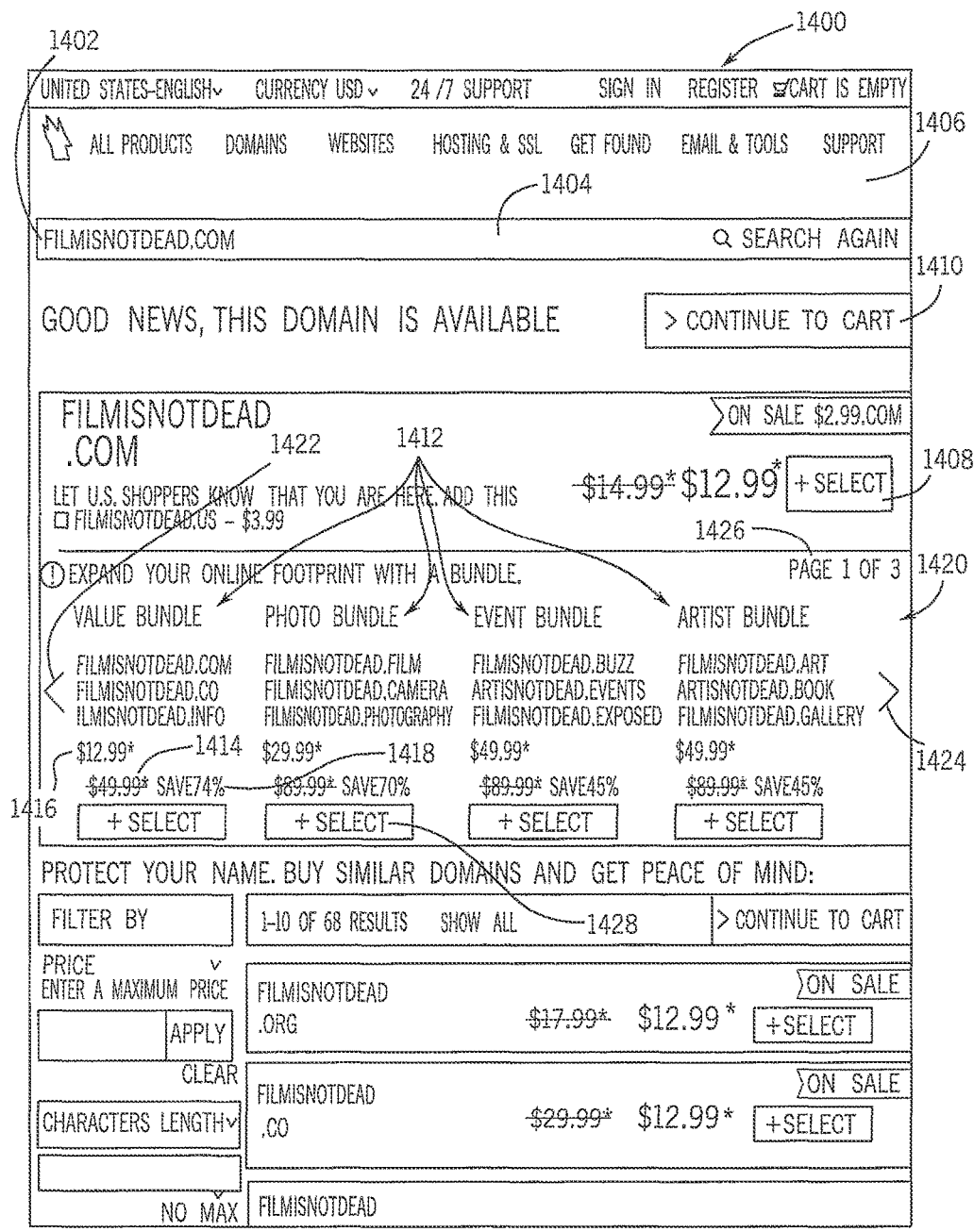
FIG. 14 is a screenshot showing an example checkout page user interface including a multi-bundle carousel.

Once the relevance score(s) are calculated at step 1226, the system 100 may display one or more domain name bundles to the user at step 1228. As shown in FIG. 13, one domain name bundle 1312 is displayed on the user interface 1306. However, as shown in FIG. 14, a plurality of domain name bundles 1412 may be displayed to the user, for example. The domain name bundles 1312, 1412 may be displayed by different themes, as best shown in FIG. 14. The themes may include, but are not limited to a value bundle, a photo bundle, an event bundle, an artist bundle, and the like. The various themes for the domain name bundles can be generated based on some or all of the data acquired the previous steps outlined in FIG. 12.

In one non-limiting example, the system 100 may arrange the candidate domain names into the themed bundles using a classification process described above, or a different process. Once the candidate domain names are arranged into the themed bundles, the system 100 may present one or more of the bundles to the user in a user interface for selection and purchase, or for dismissal if the user is not interested in them.

One implementation of an interface for presenting the themed bundles to the user may be presented during a domain search. That is, before the interface is presented, the user provided the desired primary domain name or one or more keywords to the system 100 as input data (i.e., domain search terms) and the system 100 generated the candidate domain names and identified one or more suitable themes (not necessarily in that order) based on at least the input data; then, the system 100 added each of the candidate domain names to one or more bundles each associated with an identified theme. Referring to FIGS. 13 and 14, each bundle 1312, 1412 may then be presented to the user as a bundle carousel 1320, 1420. The bundle carousel 1320 shown in FIG. 13 includes a single domain name bundle 1312, and the bundle carousel 1420 shown in FIG. 14 includes the plurality of domain name bundles 1412. The number of domain name bundles 1312, 1412 presented to the user may be determined by the width of the domain names in each bundle 1312, 1412, for example.

The bundle carousel will now be described with respect to the bundle carousel 1420 shown in FIG. 14. However, similar features are included in the bundle carousel 1320 shown in FIG. 13, and thus similar reference numbers are used. In general, the bundle carousel allows users to visualize different relevant themes of domain name bundles for their current purchases. In addition, the bundle carousel presents the bundles horizontally or vertically adjacent to each other, and allows users to scroll or paginate through a list of domain name bundles and pick the most relevant bundle.

Returning to FIG. 14, the bundle carousel 1420 may include, for example, left and right caret buttons 1422, 1424 to allow the user to paginate horizontally through one or more pages of domain name bundles 1412 on the user interface 1406. In alternate embodiments, the bundles 1412 may be arranged vertically within the carousel 1420 and the caret buttons 1422, 1424 may be positioned at the top and bottom of the carousel so the user paginates vertically through the carousel 1420. A page number 1426 may also be displayed to the user to indicate the current page position. Each domain name bundle 1412 displays the theme and candidate domain names and may further display a purchase button 1428 and one or more lines of additional textual or graphical information about the domain name bundle 1412, such as the purchase price 1416. The purchase button 1428 allows the user to immediately purchase the domain name bundle 1412 or add it to a shopping cart.

The user may click or perform a gesture on the user interface 1406, such as click the left or right caret buttons 1422, 1424 and select the purchase button 1428 corresponding to one of the domain name bundles 1412 in the bundle carousel 1420. The user may also dismiss the domain name bundles 1412 in the bundle carousel 1420 by simply paginating past and/or not selecting the displayed domain name bundle. As the user is performing the various clicks and/or gestures, the system 100 may collect feedback via the interface 1406, the feedback comprising information describing some or all of the user's interactions with the interface 1406.

The various gestures performed by the user may correspond to decision step 1230 of FIG. 12, such that the system 100 determines whether the user selects a domain name bundle related to their searched domain name. For example, the system 100 may receive an indication that the user dismissed (e.g., paginated past) a particular domain name bundle 1412 or selected one or more domain name bundles 1412 from the bundle carousel, and may adjust the bundle relevance score at step 1226 of the corresponding domain name bundle 1412 accordingly. Specifically, dismissal of the domain name bundle 1412 or of one or more domain name bundles 1412 within the bundle carousel 1420 would have a negative impact on the domain name bundle's relevance score, while purchase of a domain name bundle would have a positive impact on the domain name bundle's relevance score.

More specifically, if a domain name bundle is not picked from the bundle carousel 1420, a negative score (e.g., −1) may be applied to that domain name bundle at step 1226. In contrast, if the domain name bundle is picked from the bundle carousel 1420, a positive score (e.g., +5) may be applied to the bundle at step 1226. The system 100 can then determine a logical position of the bundle within the bundle carousel (e.g., 5/100 or 10/100), and can reposition the domain name bundle based on this information. In one example, if the domain name bundle is picked from the bundle carousel 1420 and purchased by the user, the system may be configured to provide a renewal option to the user for the purchased domain name bundle at the end of a predetermined time period (e.g., at the end of one year). The domain name bundle renewal provided to the user may have one or more levels of discounts associated therewith. For example, the domain name bundle renewal may offer the user a 20% discount to renew all the domain names within the bundle.

In addition, the various gestures performed by the user corresponding to decision step 1230 of FIG. 12, may be continuously monitored by the system 100 to dynamically update the requested bundles at step 1212. Thus, the system 100 may continuously improve and recommend domain name bundles to users that relate to highly relevant domain names with high relevance scores.

Figure 15:
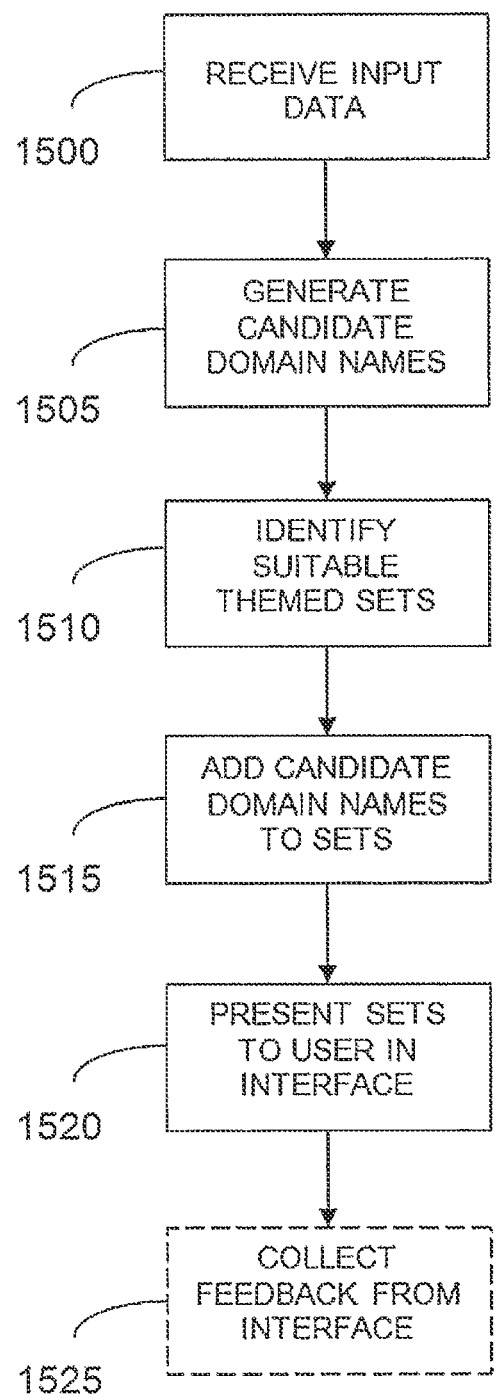
FIG. 15 is a flow diagram showing an embodiment of a method of generating and displaying candidate domain names.

The sets of candidate domain names may be presented in formats other than the bundles described above, although any theme selection or presentation criteria described above for bundles may be used for the other formats. Referring to FIG. 15, the implementation of an interface for presenting the themed sets to the user may be presented during a domain search. That is, before the interface is presented, at step 1500 the system 100 received the desired primary domain name or one or more keywords from the user as input data (i.e., domain search terms), and at steps 1505 and 1510 the system 100 generated the candidate domain names and identified one or more suitable themes (not necessarily in that order) based on at least the input data; then, at step 1515 the system 100 added each of the candidate domain names to one or more sets each associated with an identified theme. At step 1520, the system 100 may then present the sets to the user in an interface.

Referring to FIGS. 16A-20, each set may then be presented to the user as a stack 702. A stack 702 may include a header tile 704 oriented at the top of the stack 702, and a plurality of domain tiles 706 arranged below the header tile 704 of the stack 702 and above the header tile 704 of a subsequent stack 702, if any. The header tile 704 may display the theme of the set associated with the stack 702, and may further display one or more lines of additional descriptive information explaining the relevance of the set's member domain names to the user. Each domain tile 706 displays a member domain name of the set and may further display a purchase button 708 and one or more lines of additional textual or graphical information about the member domain name, such as the purchase price.

Figure 16A:
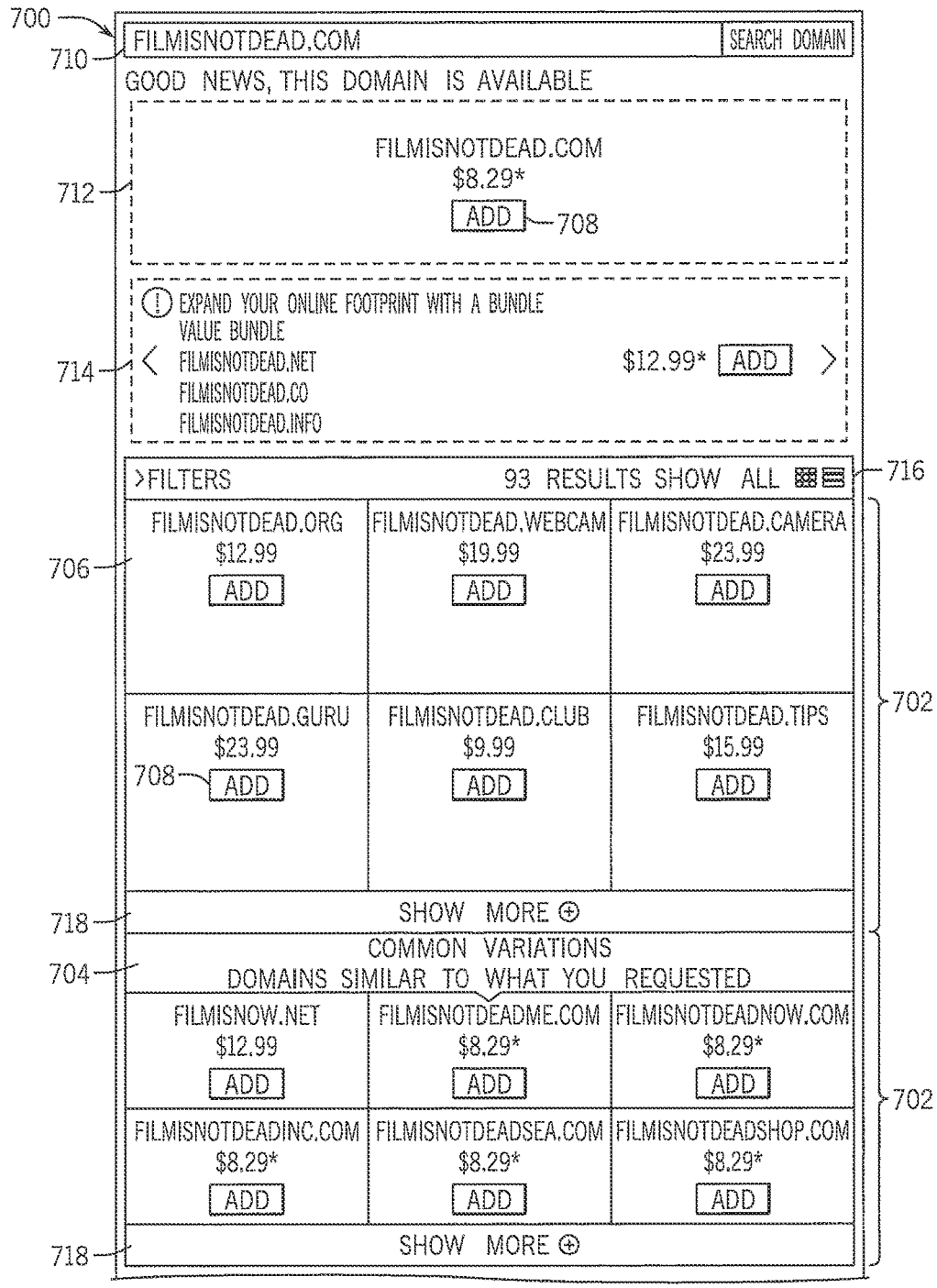
Figure 16B:
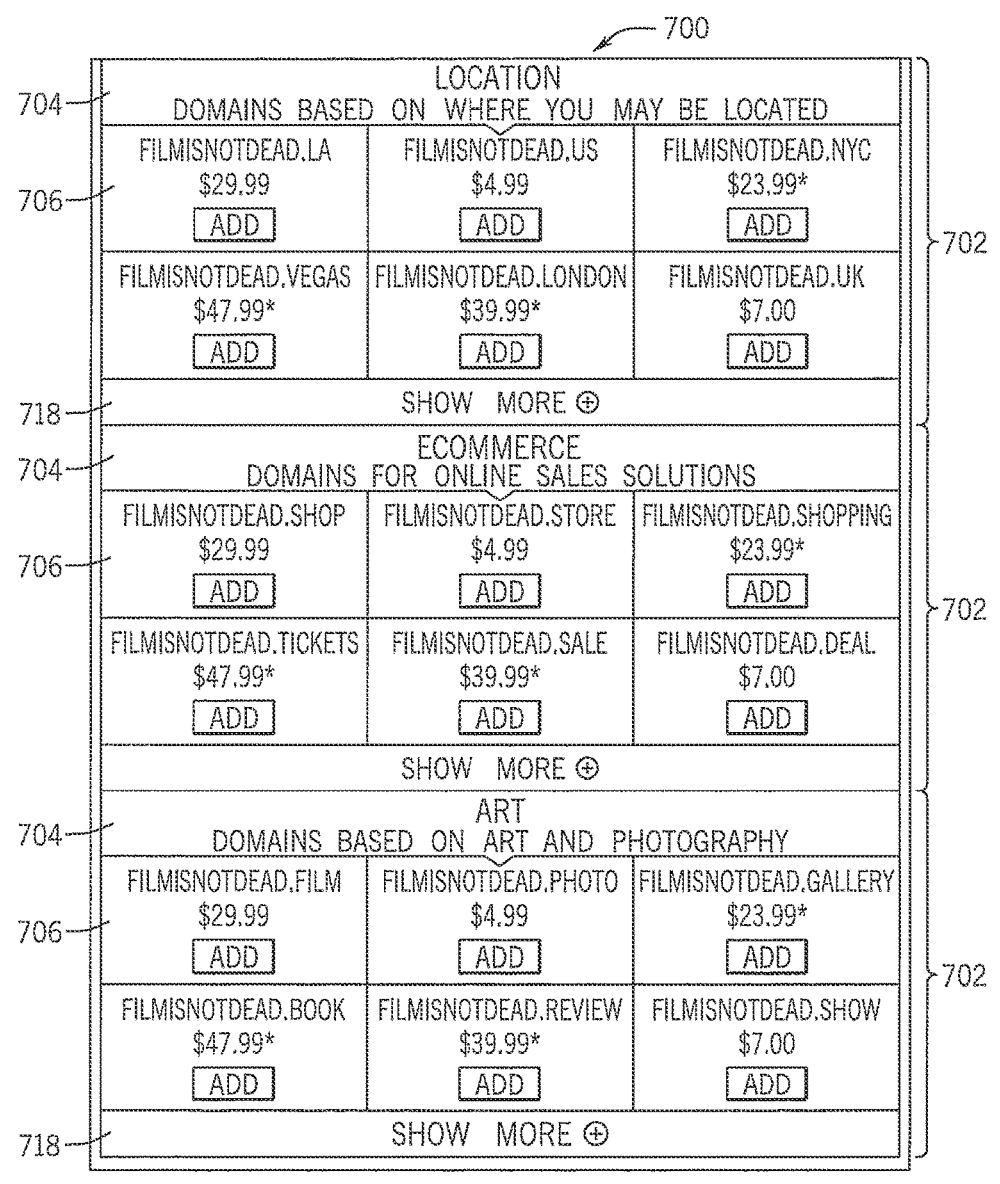

The number and arrangement of domain tiles 706 may depend on the number of member domain names in the set, the type of user device on which the interface is displayed, and characteristics of the device display (e.g., screen size and resolution). Furthermore, the interface may provide multiple interactive options to improve its usability for the user. FIGS. 16A-C illustrate an example layout of an interface 700 for a desktop, laptop, or large tablet computer having a mouse and keyboard or a touchscreen input device. A search box 710 is displayed at the top of the interface 700 and receives and displays the domain search terms. In the illustrated example, the domain search term is the desired primary domain name filmisnotdead.com. A primary result box 712 indicates that the searched primary domain name is available or not available (available in the illustrated example) and, if available, includes a purchase button 708 that allows the user to immediately purchase the domain name or add it to a shopping cart. If the domain search term is a keyword or series of keywords, the primary result box 712 may display the most likely desired primary domain name, which in one non-limiting example may be the searched keywords concatenated in sequence and having the most common TLD, ".com," appended. In this case, the primary result box 712 may include a prompt (not shown) for the user to confirm that the displayed primary domain name is actually the user's desired primary domain name, or to request that the system 100 select a new primary domain name.

Interface elements described herein may be combined for contemporaneous presentation to the user. Thus, a bundle carousel 714 as described above may be displayed below the primary result box 712 to present one or more sets of candidate domain names available for purchase together as a bundle. A stack navigation bar 716 may be presented below the bundle carousel 714, and may provide options to the user for modifying the presentation of stacks 702 in the interface 700. In the exemplary embodiment, the navigation bar 716 allows the user to modify the number of domain tiles 706 displayed and the arrangement of the display, and further provides a selectable filter menu 719 to apply one or more filters to the results. The filters may be available themes, such as price grouping, character length, category, TLD(s), geographic location, and availability (e.g., available immediately, available via auction or other aftermarket purchase, or not available). Additionally, a filter menu 719 or filter tile (not shown) presenting filter options may be displayed subsequent to a predetermined number of stacks 702 or after a predetermined percentage of the search results have been displayed (see below), in order to provide the user the opportunity to revise the search parameters. For example, after the user has scrolled through 70% of the retrieved results, the system 100 may conclude that the search results are not relevant and may present filter options (e.g., a filter menu 719) in the interface.

Figure 16D:
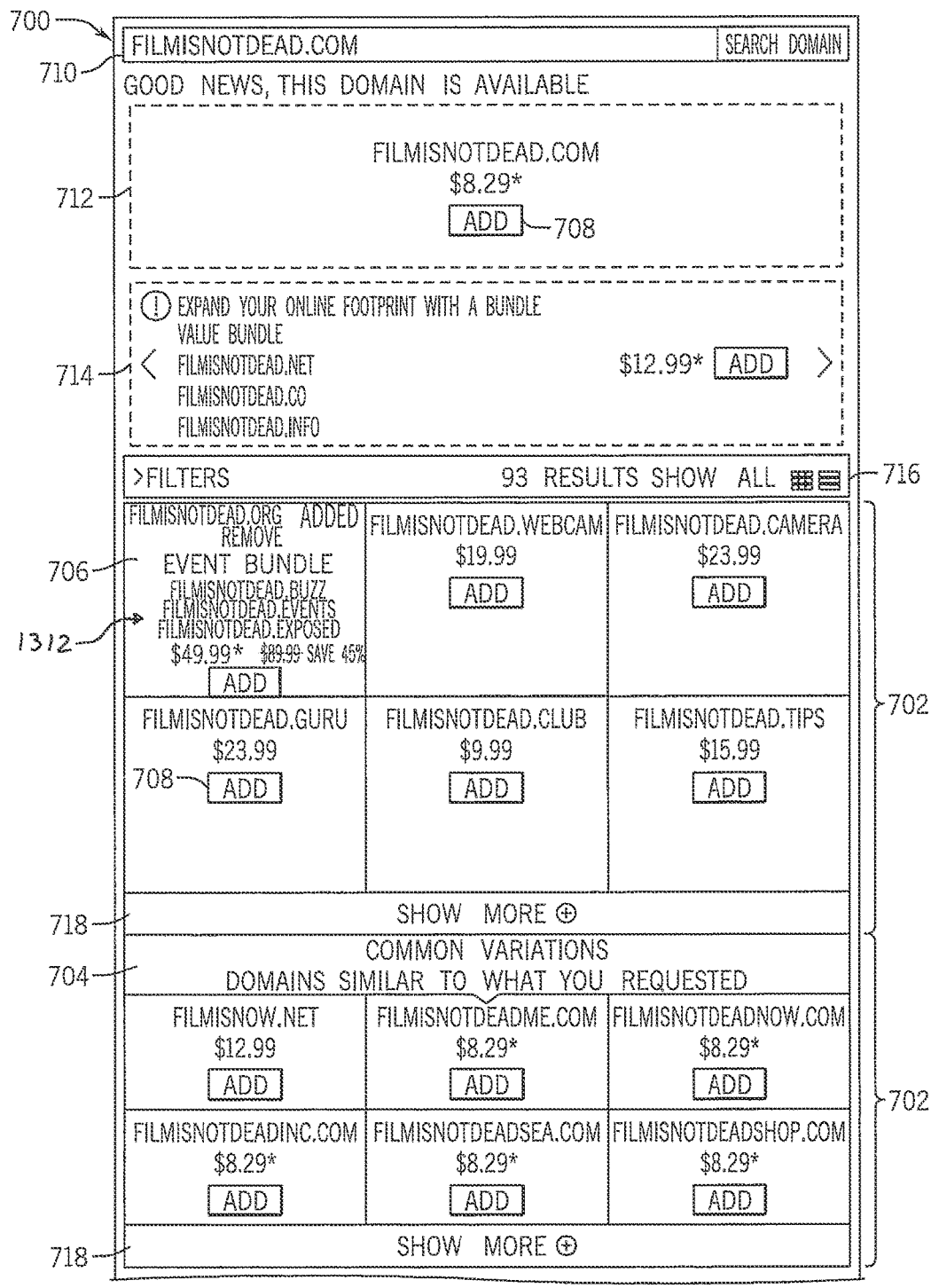

Other methods of modifying the way stacks 702 are displayed may be presented. For example, FIG. 16D illustrates the interface 700 presenting another combination of stacks 702 with the domain name bundling functions described above. Specifically, the system 100 may link the candidate domain name associated with one or more of the domain tiles 706 (e.g., domain tile 706A) with one or more candidate domain name bundles 1312, and the bundle 1312 may be presented for purchase on the domain tile 706A once the user has selected it (i.e., has clicked the purchase button 708 to add the candidate domain name associated with the domain tile 706 to the shopping cart). The candidate domain name bundle 1312 may be created according to the above-described methods using the candidate domain name of the domain tile 706A as the input data or primary domain name. The domain tile 706A may include the option for the user to remove the selected candidate domain name from the shopping cart, after which the domain tile 706A may revert to its previous appearance (i.e., displaying the candidate domain name as in the domain tiles 706 of FIG. 16A).

One or more stacks 702 are then displayed below the stack navigation bar 716, according to the options selected by the user. While any number of stacks 702 and any number of domain tiles 706 may be displayed in vertically stacked fashion, a suitable default arrangement for a typical desktop computer is illustrated. In another embodiment, the stacks 702 may be displayed in horizontally stacked fashion, and the user may switch between displayed stacks 702 via mouse click or gesture. Returning to the illustration, five stacks 702 are presented in order of decreasing relevance score of each corresponding set (in this case, for the search term "filmisnotdead.com," the five most relevant stacks 702 correspond to the following sets: commonly selected TLDs; common spelling variations; geographic locations; TLDs in the Ecommerce category; and TLDs in the Art category). The topmost stack 702 may be displayed with or without its header tile 704. The domain tiles 706 may be presented in horizontal or vertical stacks according to the number of tiles 706 to display, the length of displayed candidate domain names, and the available interface width. In the illustrated example, the domain tiles 706 are presented six at a time in three columns, with the most relevant candidate domain names presented first. At the bottom of each stack 702, an expand tile 718 is presented if there are additional domain tiles 706 to display in the stack 702; the user's selection of the expand tile 718 will show more domain tiles 706 for the stack 702. The interface 700 continues by displaying the next relevant stack 702, determined as described above and with respect to any applied filters.

The user may click or perform a gesture on the header tile 704 of each stack to contract the stack 702 so only the header tile 704 is shown, and then do so again to expand the stack 702. The user may also dismiss the stack by selecting an appropriate prompt or performing a gesture, such as swiping the header tile 704 to the left or right, to remove it from the display. The user may add candidate domain names to a shopping cart (or purchase them immediately) using the purchase button 708 on each domain tile 706. The system 100 may collect feedback via the interface 700 (see step 1525 of FIG. 15), the feedback comprising information describing some or all of the user's interactions with the interface 700. For example, the system 100 may receive an indication that the user dismissed a particular stack 702 or selected one or more domains from a particular stack 702, and may adjust the relevance score of the corresponding set accordingly. Specifically, dismissal of the stack 702 or of one or more domain tiles 706 within the stack 702 would have a negative impact on the set's relevance score, while purchase of a member domain name would have a positive impact on the set's relevance score.

Figure 17:
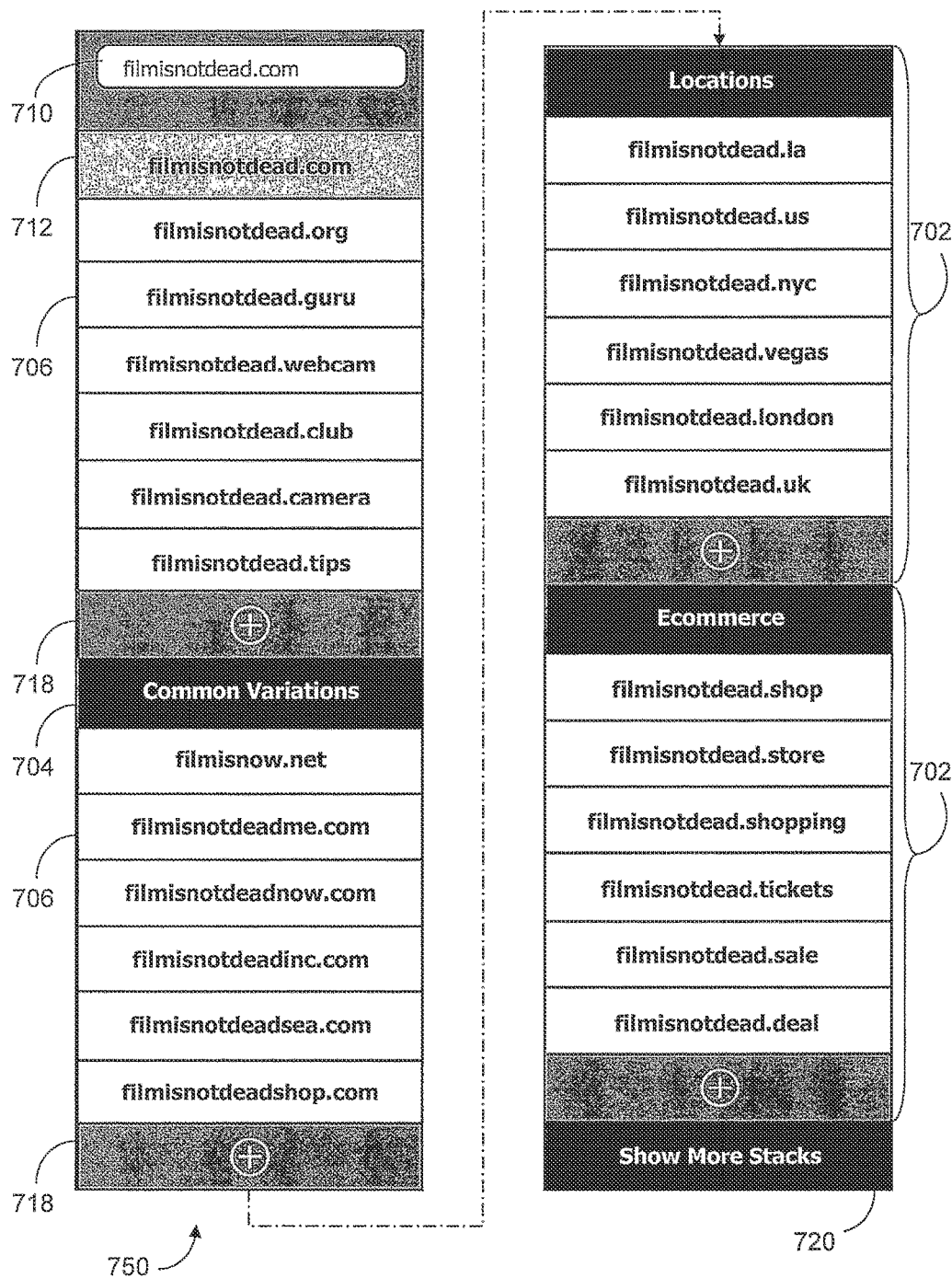
FIGS. 17-19 are diagrams showing another example user interface for displaying candidate domain names in stacks of themed sets.

Referring to FIG. 17, another version of an interface 750 for displaying candidate domain names in a domain search may be optimized for viewing on a smartphone or other mobile device, typically having a touchscreen input. FIG. 17 is an expanded diagram showing the stacks 702 arranged so that all tiles are stacked vertically. A portion of the interface 750 may be shown on the device display (see FIGS. 18-19), and the user may scroll up and down to view the other portions of the interface 750. As in the exemplary desktop interface 700, the mobile interface 750 displays stacks 702 with header tiles 704 and one or more domain tiles 706, followed by an expand tile 718 if applicable. The stacks 702 may again be stacked by relevance score of the corresponding sets. In one embodiment, the default display of the interface 750 may show the stacks 702 collapsed, so that the user touches or swipes a header tile 704 to expand the stack 702 if the user is interested in seeing the domain tiles 706. A default maximum number of stacks 702 (e.g., four) may be shown, with one or more closing tiles 720 displayed at the bottom of the interface 750. The closing tiles 720 may prompt the user to request more stacks 702, which are then displayed, or to refine the search terms to produce new results. The stacks 702 may be expanded, collapsed, and dismissed, and domain tiles 706 selected for purchase or dismissed, as described above. The system 100 may collect feedback from the user's interactions with the interface 750.

Figure 18:
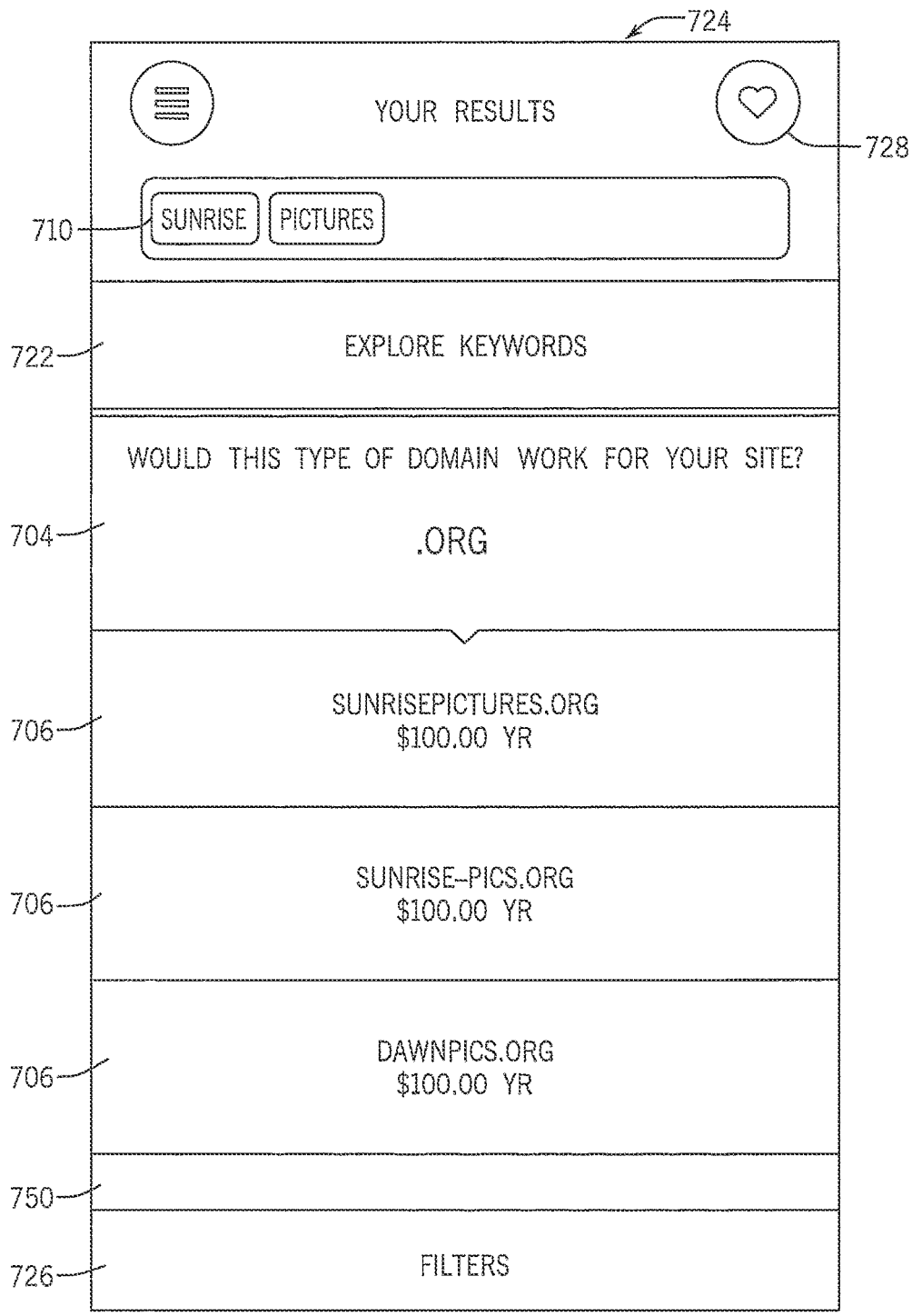
Figure 19:
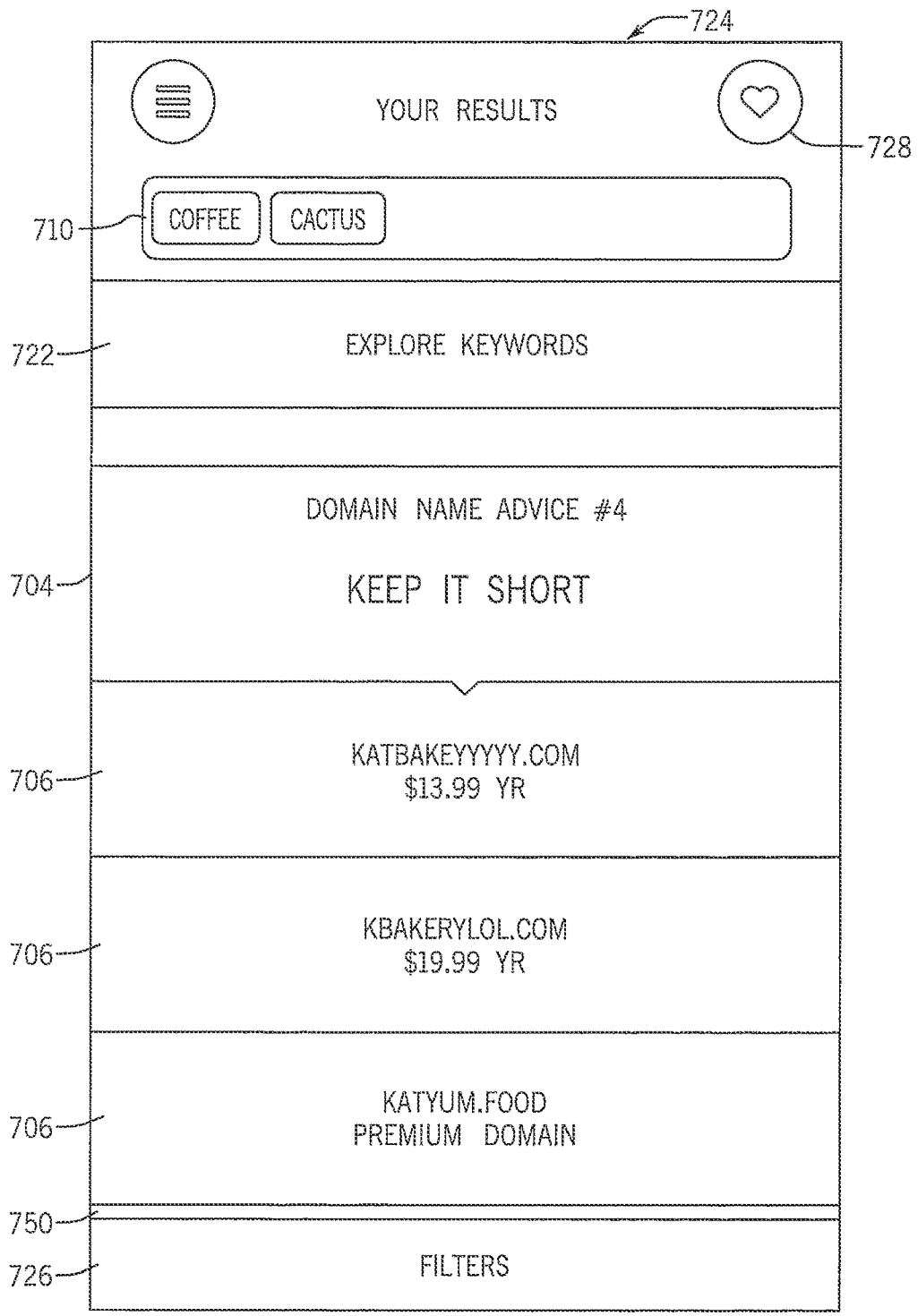
Figure 20:
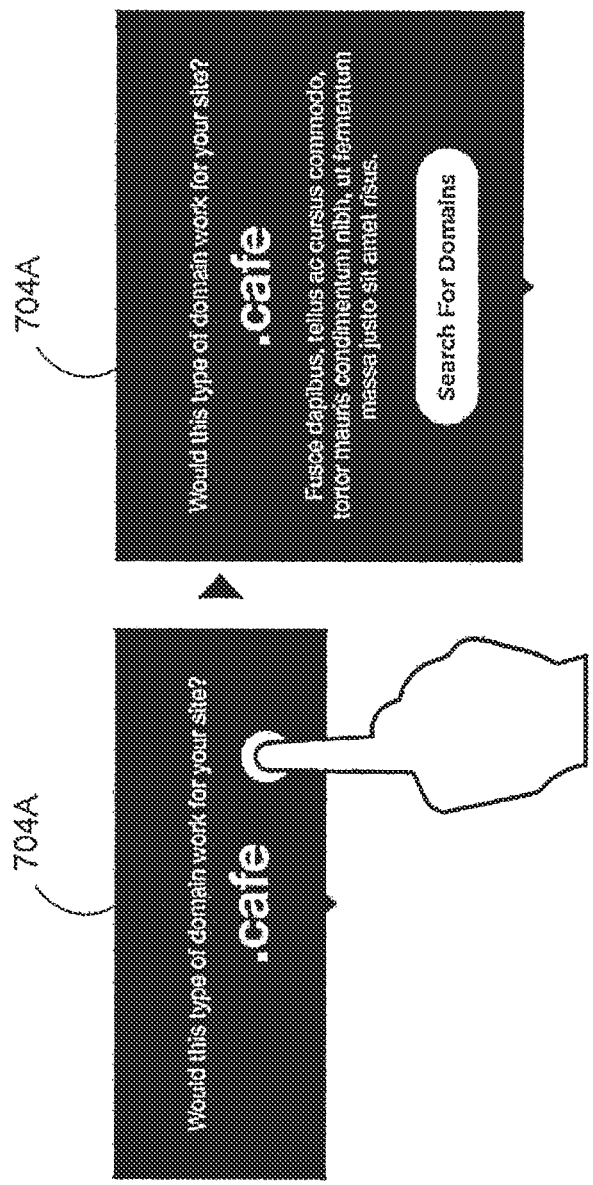
FIG. 20 is a diagram showing an example interactive header tile in accordance with the example user interfaces of FIGS. 16A-19.

FIGS. 18-19 illustrate additional examples of interactions and displayed information in the interface 750. Referring to FIG. 18, the interface 750 may include a keyword button 722 that displays a keyword assistant as described in U.S. patent application Ser. No. 14/097,022, entitled "Suggesting Name Identifiers Using Interactive Keywords," owned by the present Applicant and incorporated herein by reference. The keyword identifier provides synonymous or similar keywords to those of the input data and invites the user to emphasize and de-emphasize keywords the system 100 may use in its theme selection and candidate domain name generation. Navigation may be organized into one or both of a top navigation bar 724 and a bottom navigation bar 726. Example navigation options include changing display configurations and applying filters as described above. Another option is "favoriting" one or more stacks 702 or one or more domain tiles 706, which may save the "favorited" results in a list (accessible, for example, through a favorites icon 728) for later review. Furthermore, "favoriting" may increase the relevance score of one or both of the set and the candidate domain name. Referring to FIG. 19, the header tile 704 of one or more stacks 702 may include further additional information, such as domain name advice that educates the user regarding selecting proper domain names. The system 100 may produce such domain name advice by retrieving it from an internal or otherwise accessible database. In some embodiments, the domain name advice may be linked to each theme, such that one or more appropriate records of domain name advice may be (perhaps randomly) selected for display in the header tile 704.

In some embodiments, in addition to driving the user toward the most relevant sets using relevance score-based display, the interface 700, 750 may drive the user toward new or lesser known candidate domain names, such as premium, discounted, or aftermarket domain names or domain names on newly-released, pre-registrable, or localized (e.g., "yourdomain.vegas") TLDs. Thus, some of the header tiles 704 may display information about and invite the user to review such products. Additionally, as shown in FIG. 17, a header tile may be a supplementary header tile 704A, in which the additional information supplied is too voluminous to be displayed in the default view. The interface 700, 750 may allow the user to tap the supplementary header tile 704A, which may expand the tile 704A to display all of the additional information.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

The invention claimed is:

1. A method, comprising:
receiving, by at least one server communicatively coupled to a computer network, input data from a user, the input data comprising one or more search terms;

automatically obtaining, by the at least one server from a user device in electronic communication with the at least one server through the computer network, a plurality of candidate domain names relevant to the input data;

automatically arranging, by the at least one server, the plurality of candidate domain names into themed sets such that each of the themed sets contains at least one of the candidate domain names, each of the themed sets having a respective relevance score relative to one or both of the search terms and the user, and each of the themed sets being associated with a respectively different theme of a plurality of themes, wherein each candidate domain name in a given themed set corresponds to a given theme with which the given themed set is associated; and automatically displaying, via the user device, a user interface including the themed sets and enabling the selection of one or more of the candidate domain names included in the themed sets for registration, wherein the themed sets are displayed in an order according to their respective relevance scores.

2. The method of claim 1, wherein at least a portion of the plurality of themes associated with the themed sets corresponds to one or more of a domain name characteristic, a web site characteristic, and a user characteristic.

3. The method of claim 2, wherein the domain name characteristic is selected from the group consisting of an availability for purchase, a common TLD or gTLD, a synonymous TLD or gTLD, an international designation, a character length, a spelling variation, and a common keyword.

4. The method of claim 2, wherein the website characteristic is selected from the group consisting of a category, a business vertical, a type of content, a keyword, and a keyword frequency.

5. The method of claim 2, wherein the user characteristic is selected from the group consisting of: a user name, a business name, a business address, a location, a purchase history, a domain name ownership, and a usage of other products offered by the one or more servers.

6. The method of claim 1, further comprising identifying, by the at least one server, the theme associated with each themed set before obtaining the candidate domain names.

7. The method of claim 6, wherein each theme of the plurality of themes is identified from a plurality of relevant pre-stored themes.

8. The method of claim 6, wherein obtaining the candidate domain names comprises generating one or more of the candidate domain names based on each of the identified themes.

9. The method of claim 1, wherein the user interface further enables selection of one or more of the themed sets in order to register each of the candidate domain names in the selected themed set.

10. The method of claim 9, wherein upon receiving an indicator of the selection of one of the candidate domain names, the at least one server increases the relevance score of the themed set containing the candidate domain name.

11. The method of claim 1, wherein the user interface enables dismissal of one or more of the candidate domain names.

12. The method of claim 11, wherein the user interface enables dismissal of one or more of the themed sets, and wherein dismissing one of the themed sets causes the server to remove the dismissed themed set and its corresponding candidate domain names from the user interface.

13. The method of claim 12, wherein upon receiving an indicator of the dismissal of one of the themed sets, the at least one server decreases the relevance score of the dismissed themed set.

14. The method of claim 1, wherein the user interface provides a software application.

15. The method of claim 14, wherein the software application is a website builder application.

16. A system, comprising at least one server computer in communication with a computer network, the at least one server computer including a processor configured to:

receive input data from a user, the input data comprising one or more search terms;

automatically obtain, from a user device in electronic communication with the at least one server through the computer network, a plurality of candidate domain names relevant to the input data;

automatically arrange, by the at least one server, the plurality of candidate domain names into themed sets such that each of the themed sets contains at least one of the candidate domain names, each of the themed sets having a respective relevance score relative to one or both of the search terms and the user, and each of the themed sets being associated with a respectively different theme of a plurality of themes, wherein each candidate domain name in a given themed set corresponds to a given theme with which the given themed set is associated; and automatically cause, at the user device, a user interface to be displayed, the user interface including the themed sets and enabling the selection of one or more of the candidate domain names included in the themed sets for registration, wherein the themed sets are displayed in an order according to their respective relevance scores.

* * * * *